US012633663B2

(12) United States Patent
Suzuki et al.

(10) Patent No.: US 12,633,663 B2
(45) Date of Patent: May 19, 2026

(54) INTELLIGENT REFLECTING SURFACE

(71) Applicant: Japan Display Inc., Tokyo (JP)

(72) Inventors: Daiichi Suzuki, Tokyo (JP); Shinichiro Oka, Tokyo (JP); Shigesumi Araki, Tokyo (JP); Mitsutaka Okita, Tokyo (JP)

(73) Assignee: Japan Display Inc., Tokyo (JP)

( * ) Notice: Subject to any disclaimer, the term of this patent is extended or adjusted under 35 U.S.C. 154(b) by 36 days.

(21) Appl. No.: 18/673,910

(22) Filed: May 24, 2024

(65) Prior Publication Data

US 2024/0322429 A1      Sep. 26, 2024

Related U.S. Application Data

(63) Continuation of application No. PCT/JP2022/040674, filed on Oct. 31, 2022.

(30) Foreign Application Priority Data

Nov. 25, 2021      (JP) ................................. 2021-191313

(51) Int. Cl.
| | |
|---|---|
| *H01Q 3/46* | (2006.01) |
| *G02F 1/1343* | (2006.01) |
| *H01Q 3/36* | (2006.01) |
| *H01Q 15/14* | (2006.01) |

(52) U.S. Cl.
CPC ......... *H01Q 3/46* (2013.01); *G02F 1/134336* (2013.01); *H01Q 3/36* (2013.01); *H01Q 15/148* (2013.01)

(58) Field of Classification Search
CPC .......... H01Q 3/46; H01Q 3/36; H01Q 15/148; H01Q 3/44; H01Q 9/0457; H01Q 15/14; G02F 1/134336; G02F 1/13; G02F 1/133553; G02F 1/1343; G02F 1/134309; G02F 2203/02
See application file for complete search history.

(56) References Cited

U.S. PATENT DOCUMENTS

| | | | | |
|---|---|---|---|---|
| 2015/0380789 | A1* | 12/2015 | Jakoby | .................... H01P 1/184 |
| | | | | 343/905 |
| 2018/0083364 | A1 | 3/2018 | Foo | |
| 2021/0408680 | A1* | 12/2021 | Xi | ........................... H01P 1/184 |
| 2024/0243473 | A1* | 7/2024 | Lee | ...................... H01Q 9/0414 |

FOREIGN PATENT DOCUMENTS

| | | |
|---|---|---|
| JP | H11103201 A | 4/1999 |
| JP | 2019-530387 A | 10/2019 |

* cited by examiner

*Primary Examiner* — Renan Luque
(74) *Attorney, Agent, or Firm* — Maier & Maier, PLLC

(57) ABSTRACT

According to one embodiment, an intelligent reflecting surface includes a plurality of individual areas, each of the individual areas including a first area and one or more second areas, a connection area, a first substrate including a plurality of patch electrodes, a second substrate including a common electrode, the common electrode being located in the first area of each of the individual areas and the connection area and being opposed to the patch electrodes, and a liquid crystal layer held between the first substrate and the second substrate and opposed to the patch electrodes.

7 Claims, 21 Drawing Sheets

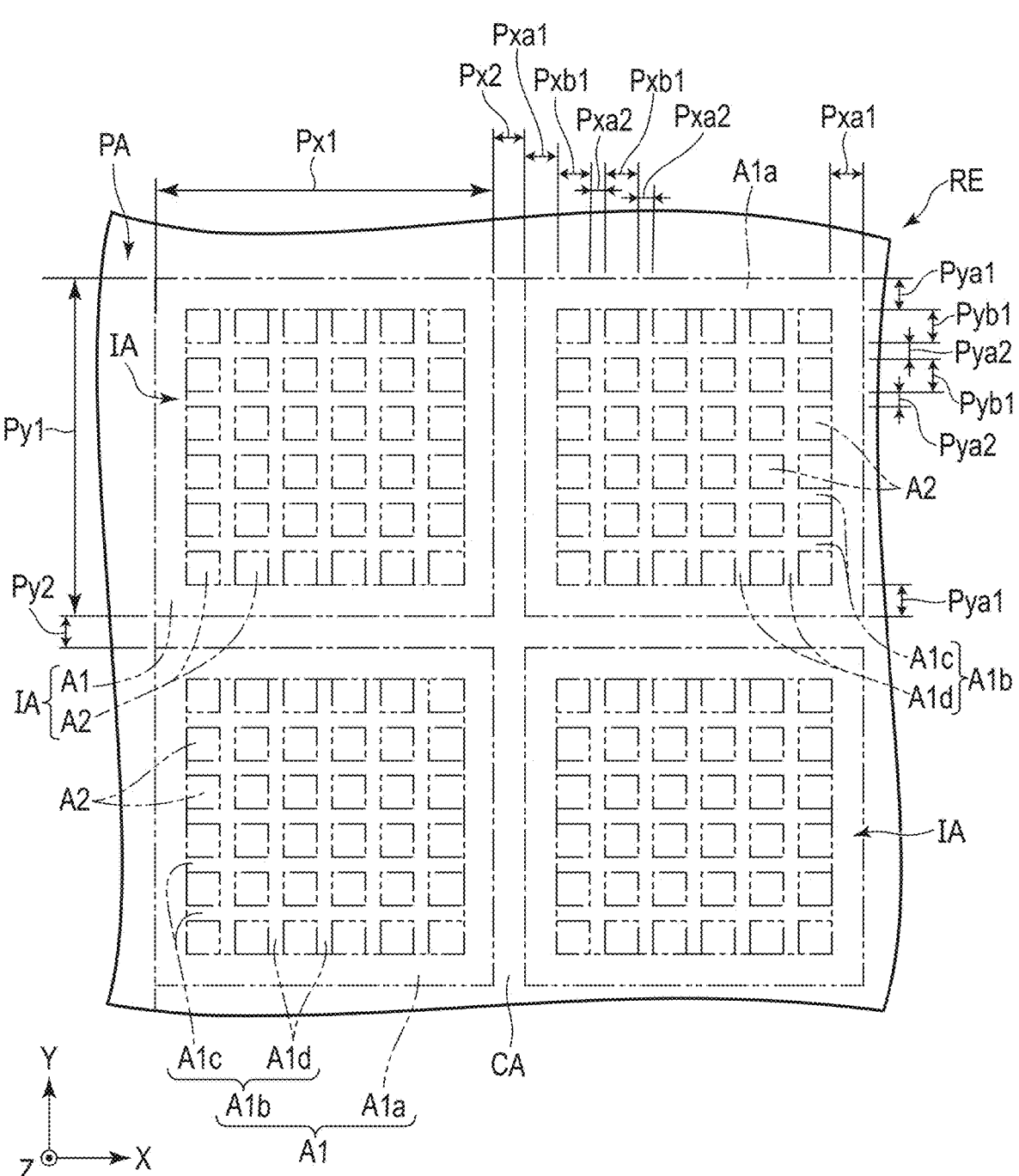
F I G. 9

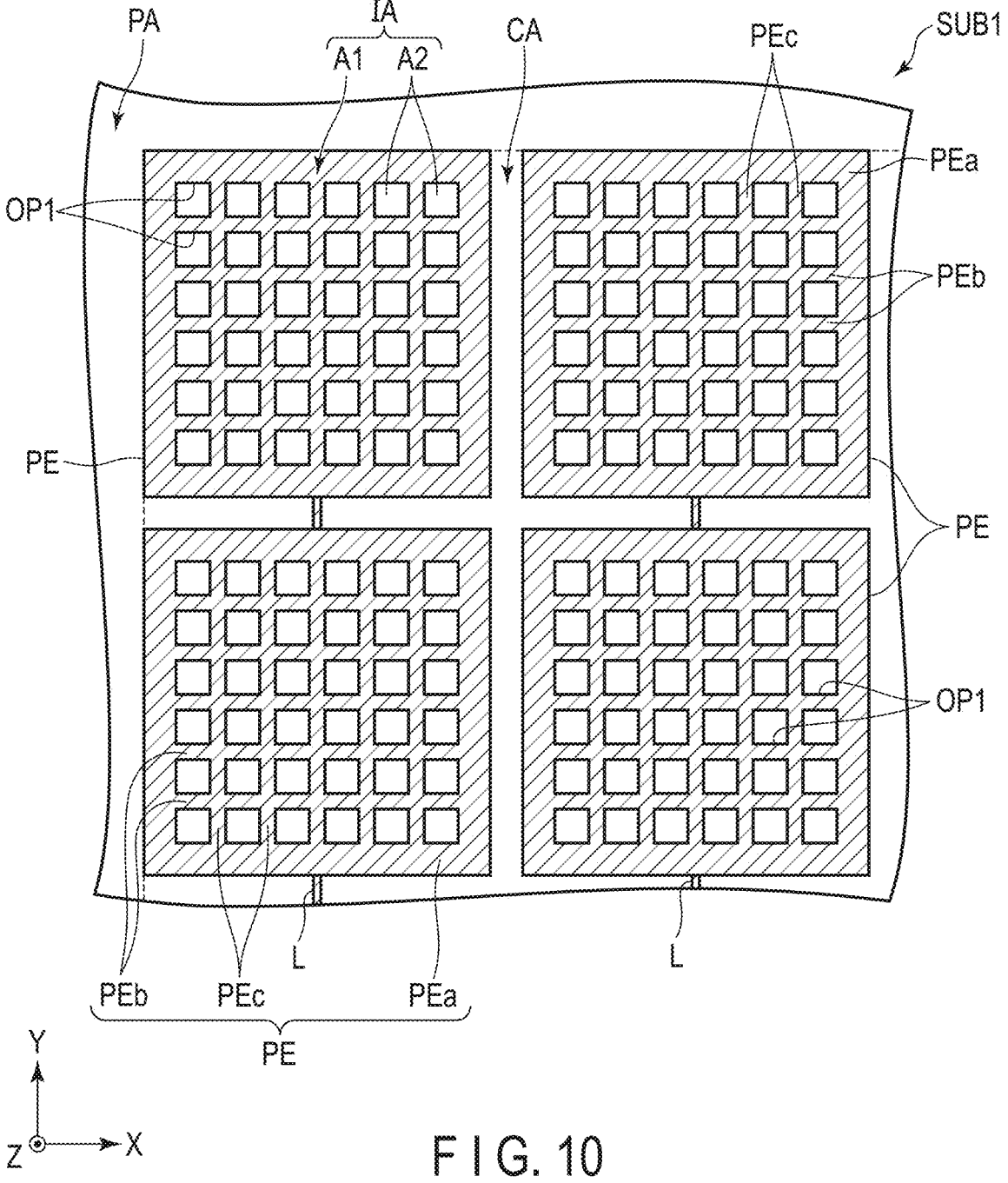
F I G. 10

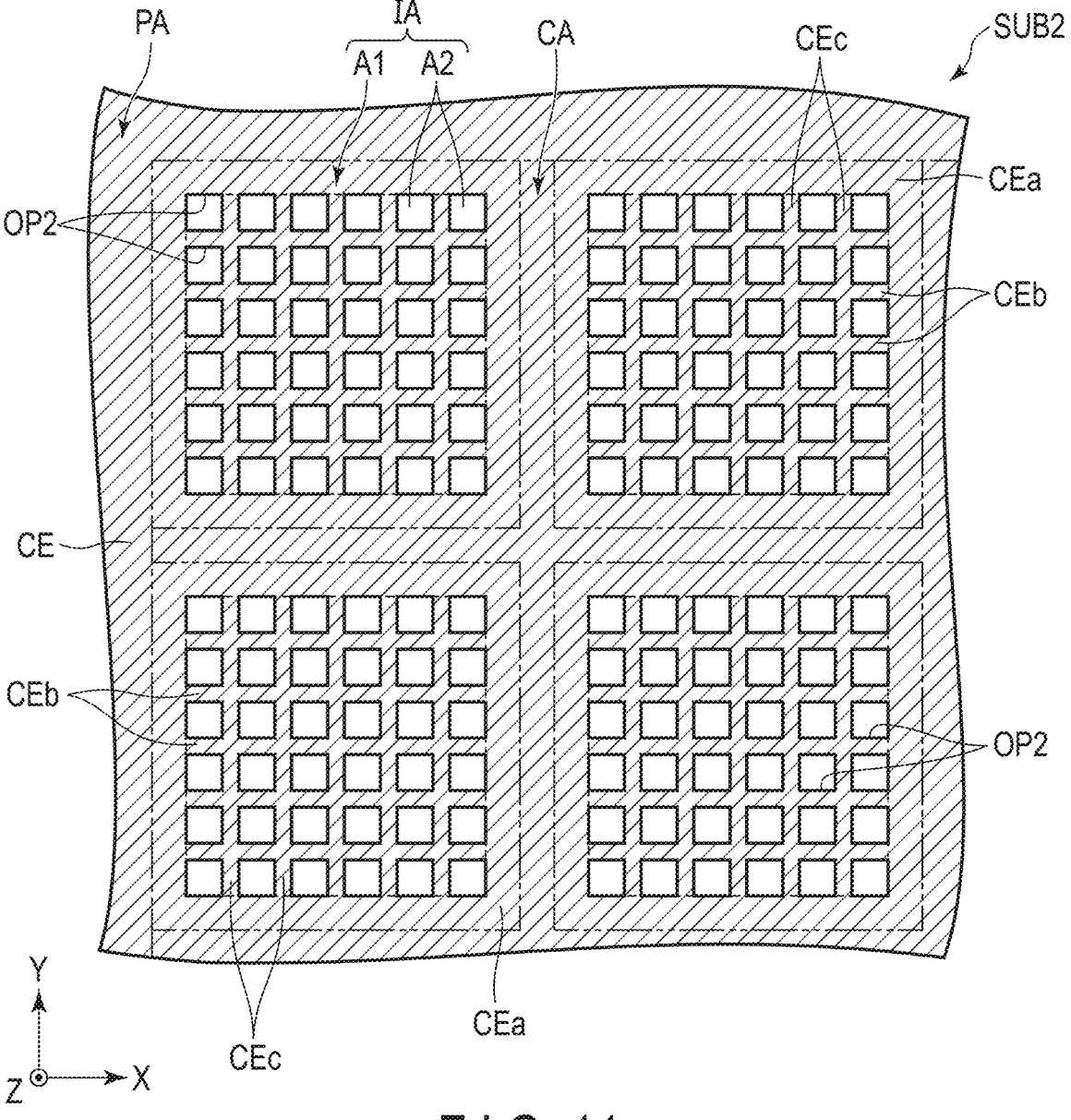
F I G. 11

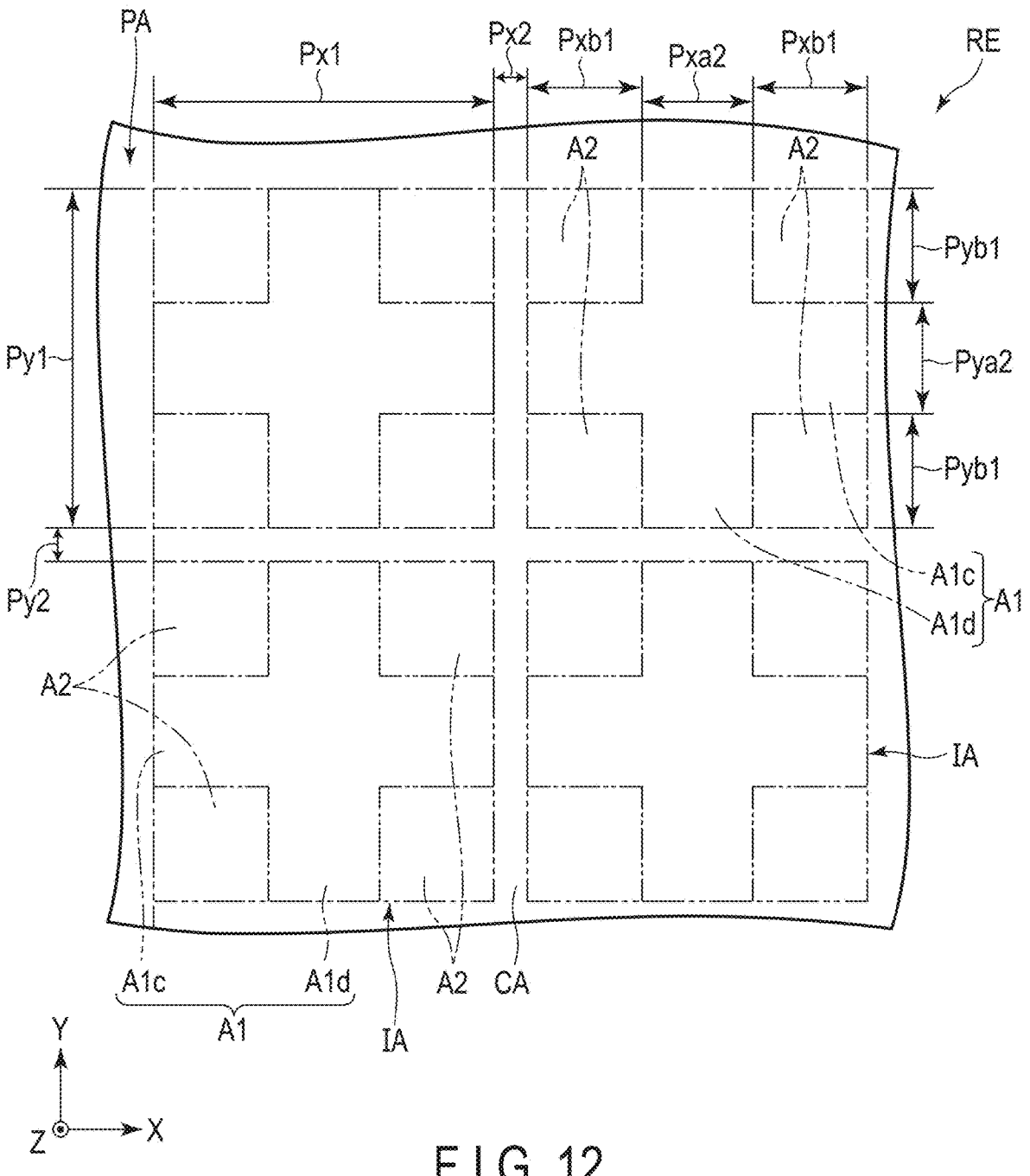
F I G. 12

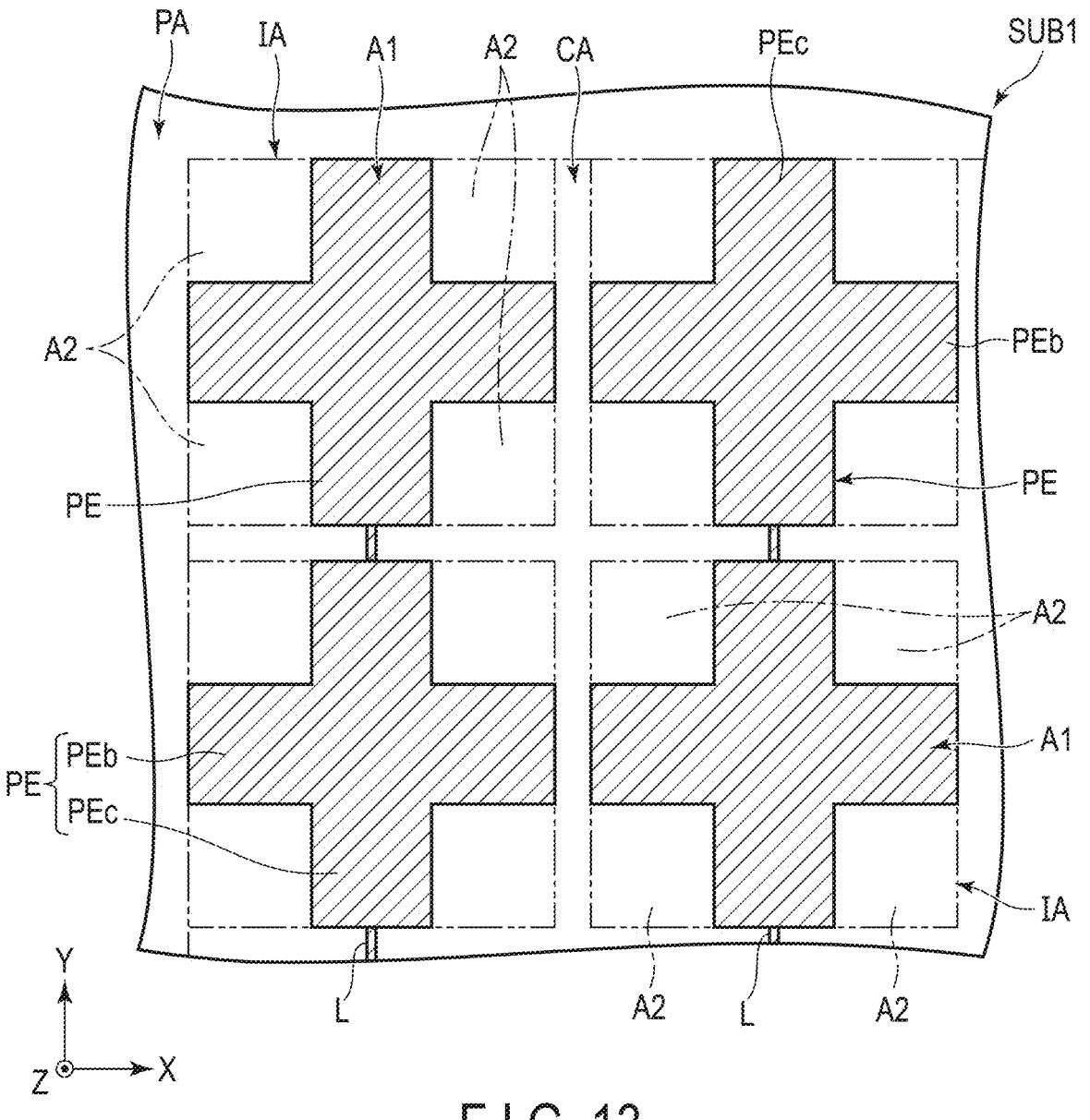
F I G. 13

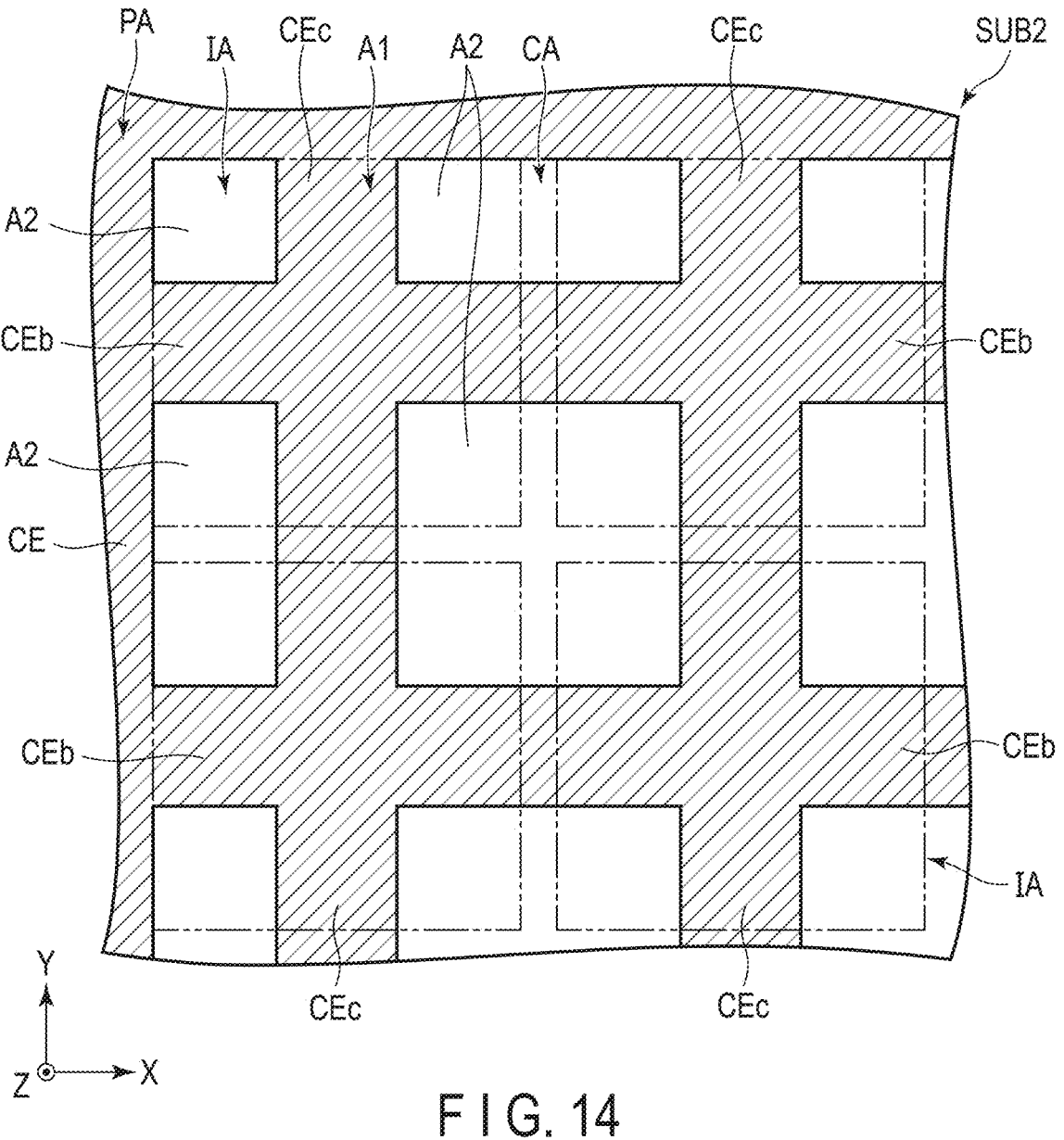
F I G. 14

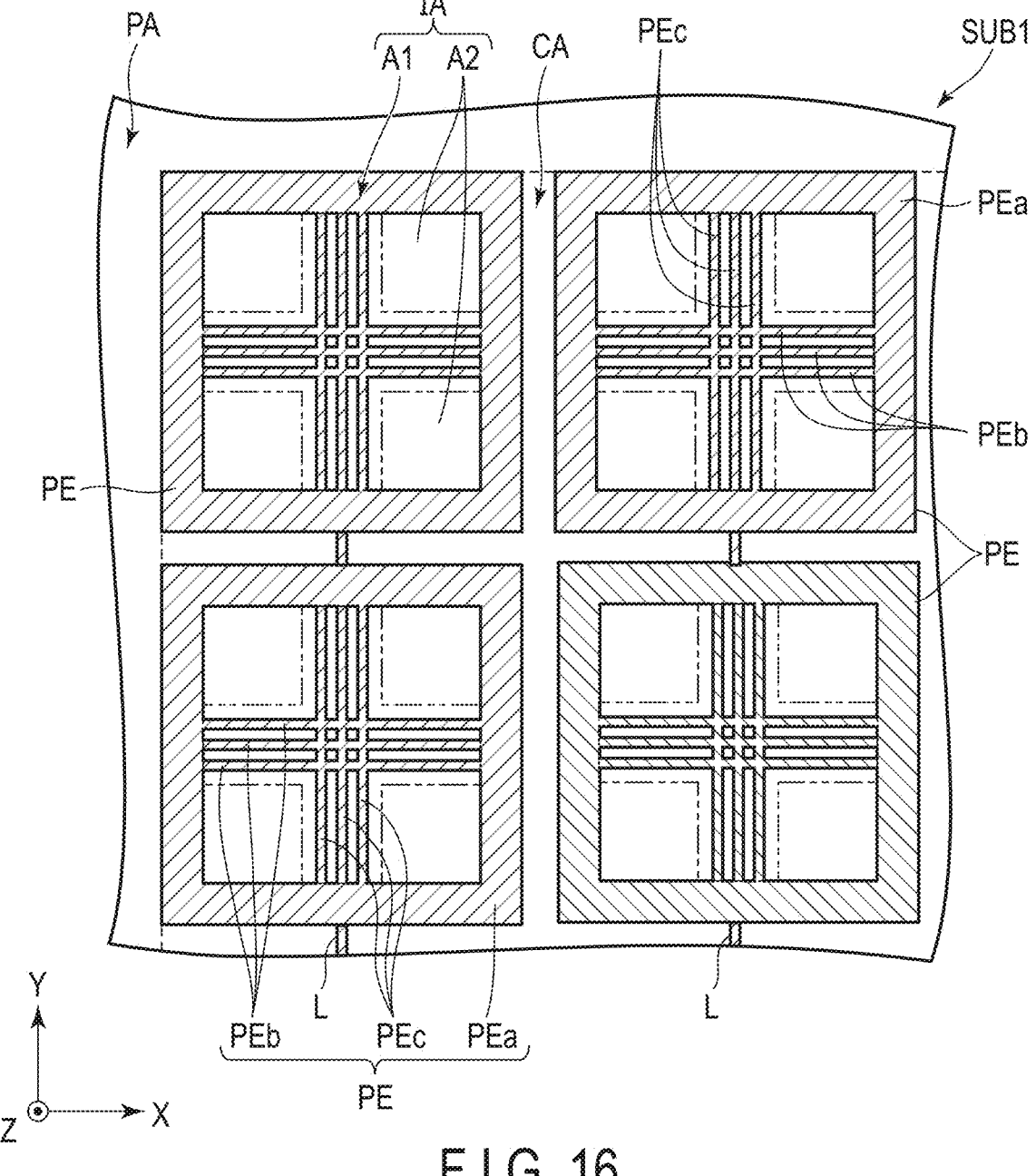
F I G. 16

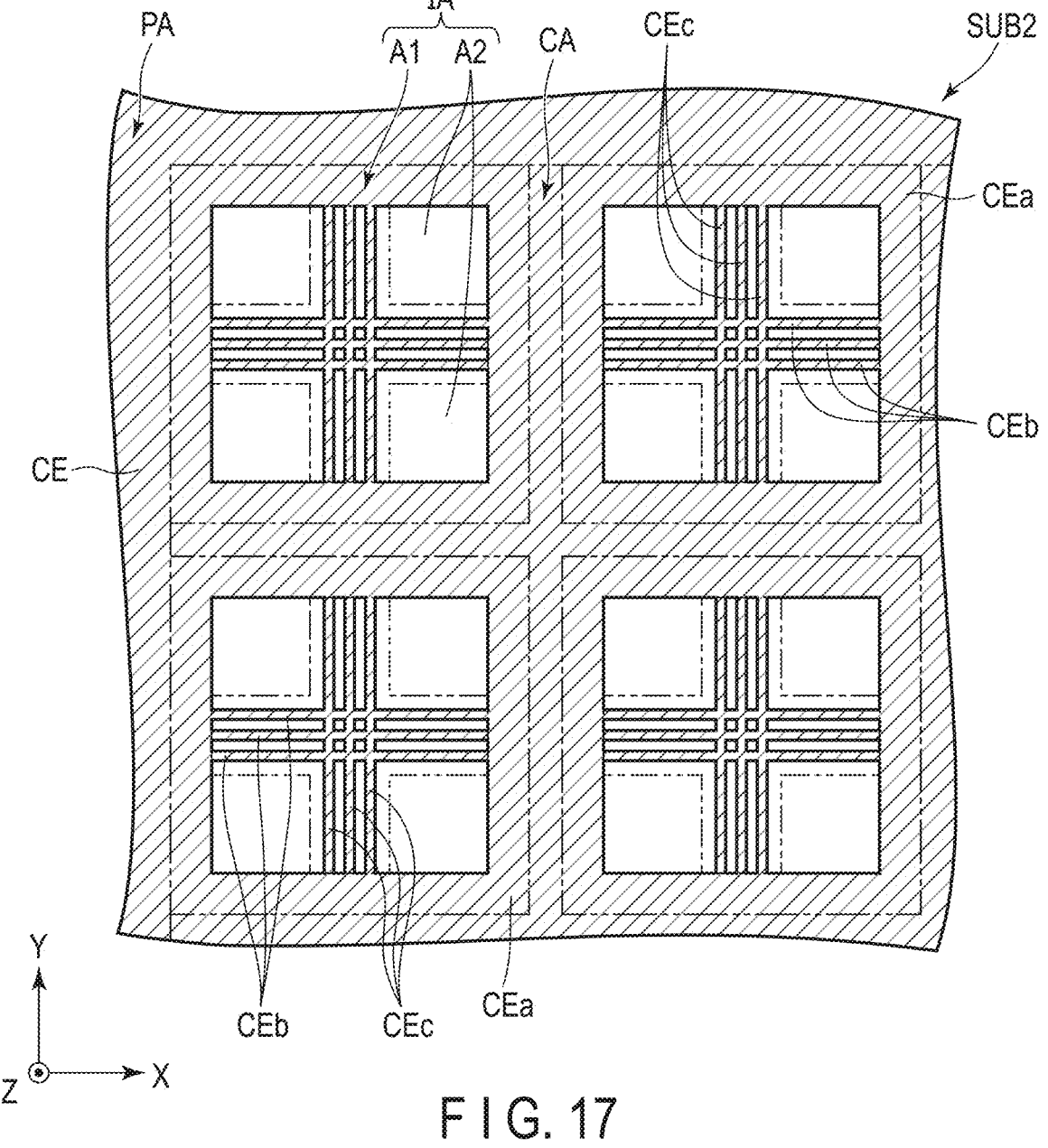
F I G. 17

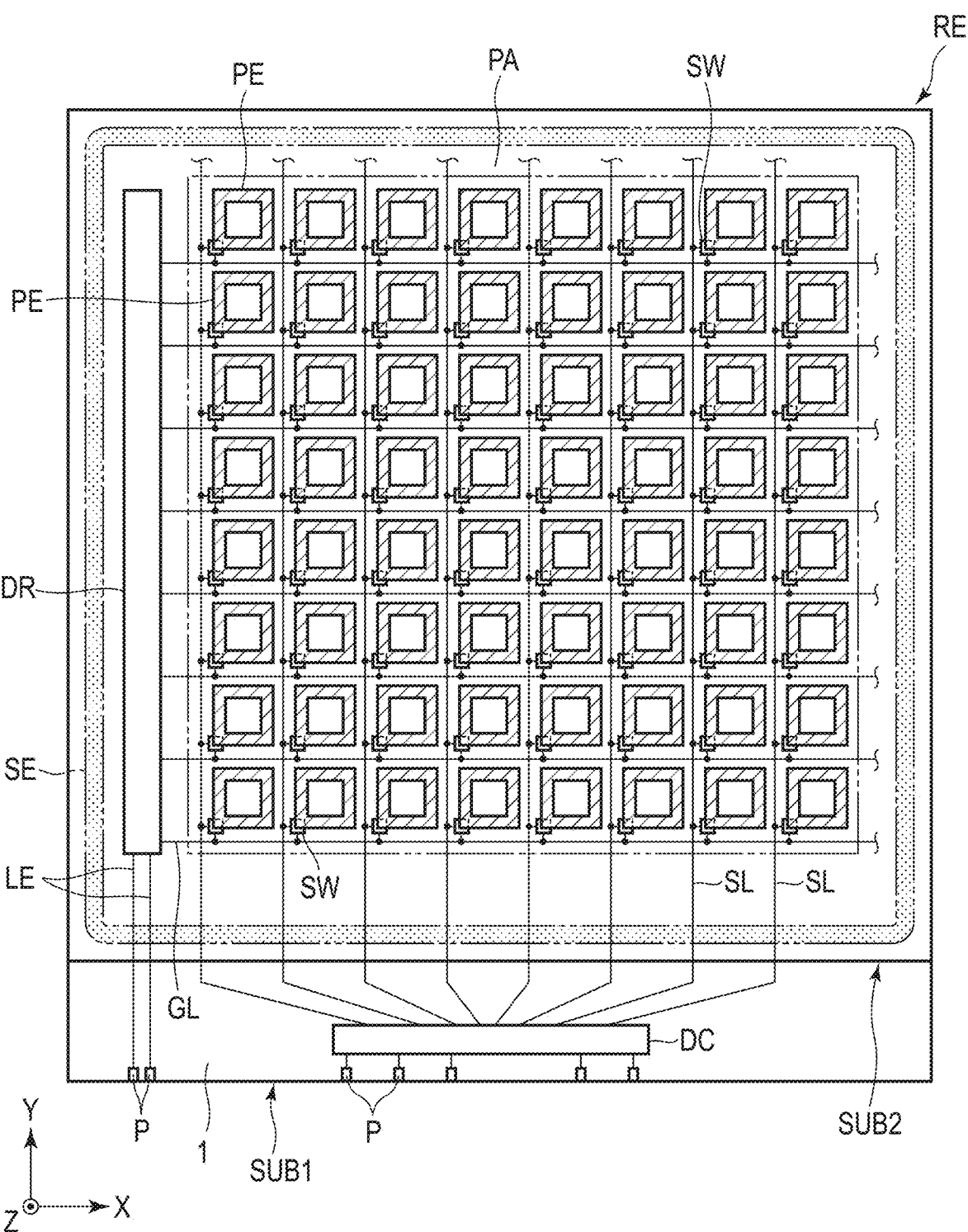
F I G. 18

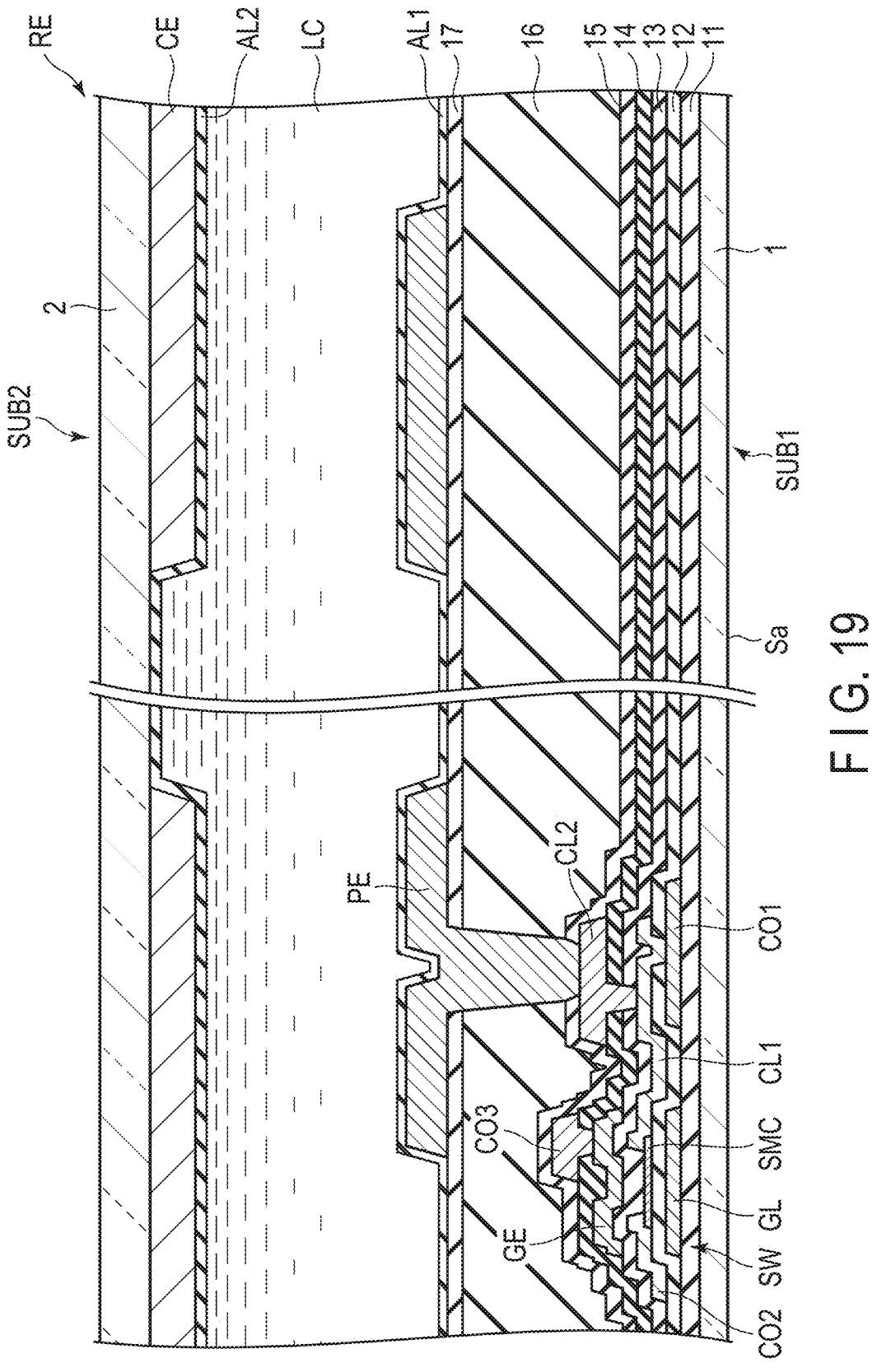
F I G. 19

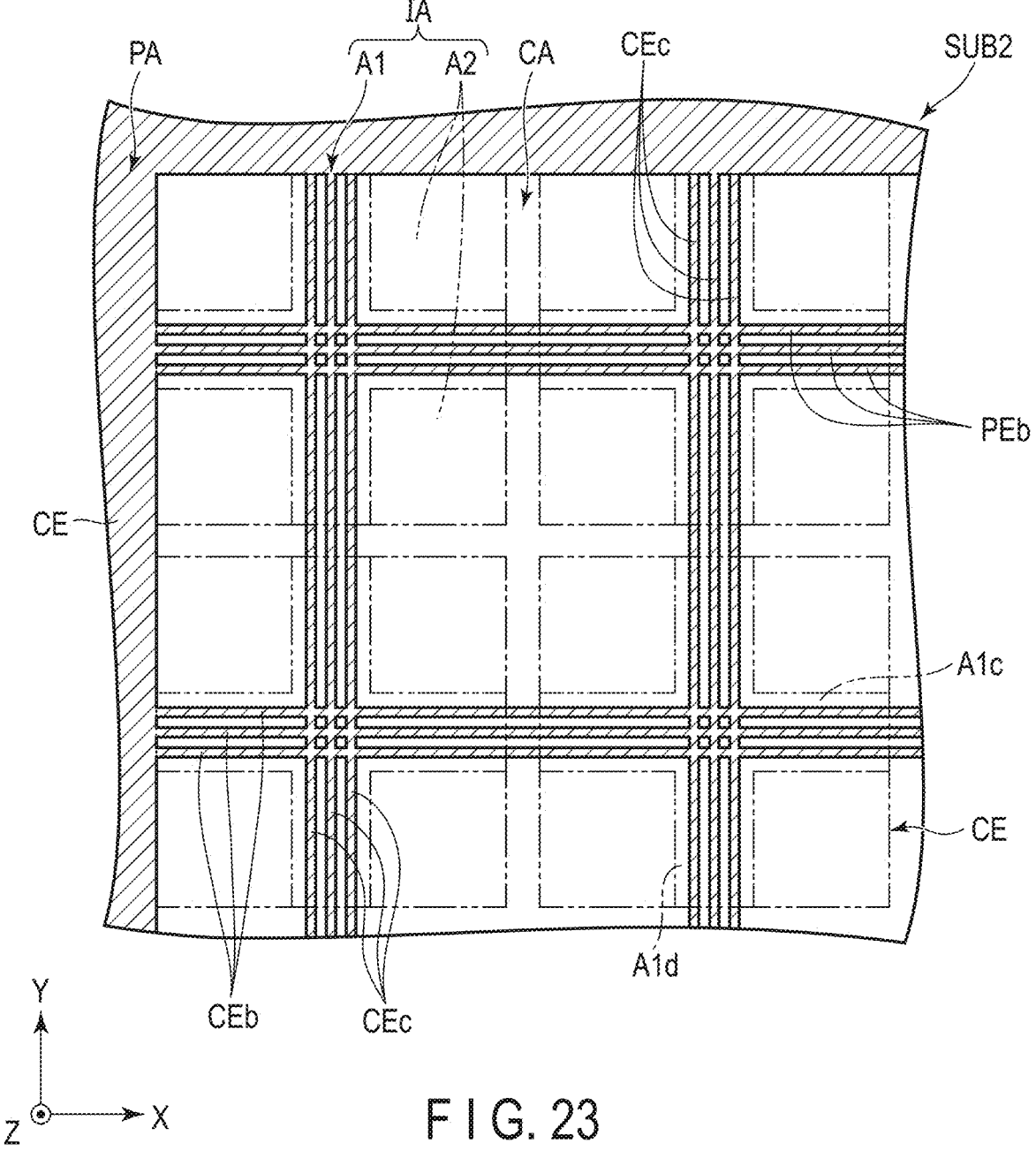
F I G. 23

INTELLIGENT REFLECTING SURFACE

CROSS-REFERENCE TO RELATED APPLICATIONS

This application is a Continuation Application of PCT Application No. PCT/JP2022/040674, filed Oct. 31, 2022 and based upon and claiming the benefit of priority from Japanese Patent Application No. 2021-191313, filed Nov. 25, 2021, the entire contents of all of which are incorporated herein by reference.

FIELD

Embodiments described herein relate generally to an intelligent reflecting surface.

BACKGROUND

An intelligent reflecting surface controlling a reflection direction of a radio wave using a liquid crystal has been studied. In this intelligent reflecting surface, reflection controllers including reflecting electrodes are arranged in one dimension (or two dimension). In this intelligent reflecting surface, a dielectric constant of a liquid crystal needs to be adjusted such that phase differences between reflected radio waves are constant between adjacent reflection controllers.

BRIEF DESCRIPTION OF THE DRAWINGS

FIG. 9 is an expanded plan view showing a part of the intelligent reflecting surface of the example 2 of the first embodiment, illustrating the plurality of individual areas, the connection area, and the peripheral area.

FIG. 10 is an expanded plan view showing the plurality of patch electrodes and the plurality of connection lines of the example 2.

FIG. 11 is an expanded plan view showing a part of the common electrode of the example 2.

FIG. 12 is an expanded plan view showing a part of the intelligent reflecting surface of the example 5 of the first embodiment, illustrating the plurality of individual areas, the connection area, and the peripheral area.

FIG. 13 is an expanded plan view showing the plurality of patch electrodes and the plurality of connection lines of the example 5.

FIG. 14 is an expanded plan view showing a part of the common electrode of the example 5.

FIG. 16 is an expanded plan view showing the plurality of patch electrodes and the plurality of connection lines of the modified example.

FIG. 17 is an expanded plan view showing a part of the common electrode of the modified example.

FIG. 18 is a plan view showing an intelligent reflecting surface of a second embodiment.

FIG. 19 is an expanded sectional view showing a part of the intelligent reflecting surface of the second embodiment.

FIG. 23 is an expanded plan view showing a part of a common electrode of the intelligent reflecting surface of the modified example of the second embodiment.

DETAILED DESCRIPTION

Figure 1:
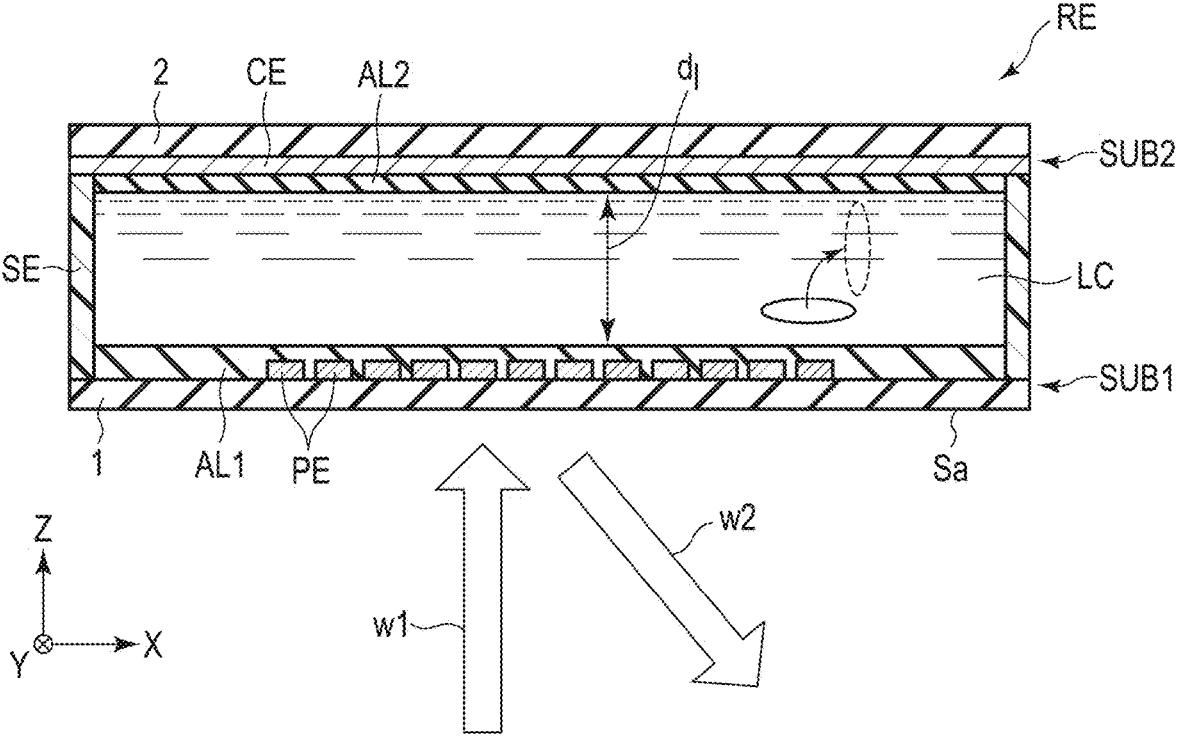
FIG. 1 is a cross-sectional view showing an intelligent reflecting surface of a first embodiment.

In general, according to one embodiment, there is provided an intelligent reflecting surface comprising: a plurality of individual areas arranged in a matrix along each of an X-axis and a Y-axis orthogonal to each other, each of the plurality of individual areas including a first area and one or more second areas other than the first area; a connection area located in gaps between the plurality of individual areas, the connection area having a grating shape and being connected to the plurality of individual areas; a first substrate including a plurality of patch electrodes, each of the plurality of patch electrodes being located in the first area of a corresponding individual area among the plurality of individual areas; a second substrate including a common electrode, the common electrode being located in the first area of each of the individual areas and the connection area and being opposed to the plurality of patch electrodes in a direction parallel to a Z-axis orthogonal to each of the X-axis and the Z-axis; and a liquid crystal layer held between the first substrate and the second substrate and opposed to the plurality of patch electrodes.

Embodiments will be described hereinafter with reference to the accompanying drawings. The disclosure is merely an example, and proper changes in keeping with the spirit of the inventions, which are easily conceivable by a person of ordinary skill in the art, come within the scope of the inventions as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the inventions. In addition, in the specification and drawings, the same elements as those described in connection with preceding drawings are denoted by like reference numbers, and detailed description thereof is omitted unless necessary.

First Embodiment

First, a first embodiment will be described. FIG. 1 is a cross-sectional view showing an intelligent reflecting surface RE of the first embodiment. The intelligent reflecting surface RE can reflect radio waves and functions as a relay device for radio waves.

As shown in FIG. 1, the intelligent reflecting surface RE comprises a first substrate SUB1, a second substrate SUB2, and a liquid crystal layer LC. The first substrate SUB1 includes an electrically insulating basement 1, a plurality of patch electrodes PE, and an alignment film AL1. The basement 1 is formed in a flat plate shape and elongates along an X-Y plane having an X-axis and a Y-axis orthogonal to each other. The alignment film AL1 covers the plurality of patch electrodes PE.

The second substrate SUB2 is opposed to the first substrate SUB1 with a predetermined gap. The second substrate SUB2 includes an electrically insulating basement 2, a common electrode CE, and an alignment film AL2. The basement 2 is formed in a flat plate shape and elongates along the X-Y plane. The common electrode CE is opposed to the plurality of patch electrodes PE in a direction parallel to a Z-axis orthogonal to each of the X-axis and the Y-axis. The alignment film AL2 covers the common electrode CE. In the present embodiment, each of the alignment film AL1 and the alignment film AL2 is a horizontal alignment film.

The first substrate SUB1 and the second substrate SUB2 are bonded to each other by a sealing material SE arranged in a peripheral portion of each of these substrates. The liquid crystal layer LC is provided in a space surrounded by the first substrate SUB1, the second substrate SUB2, and the sealing material SE. The liquid crystal layer LC is held between the first substrate SUB1 and the second substrate SUB2. One side of the liquid crystal layer LC is opposed to the plurality of patch electrodes PE. The other side of the liquid crystal layer LC is opposed to the common electrode CE.

A thickness (cell gap) of the liquid crystal layer LC is referred to as a thickness $d_l$. The thickness $d_l$ is greater than a thickness of a liquid crystal layer of a normal liquid crystal display panel. In the present embodiment, the thickness $d_l$ is 50 μm. As long as a reflection phase of a radio wave can be sufficiently adjusted, the thickness $d_l$ can be less than 50 μm. In addition, the thickness $d_l$ can be greater than 50 μm to increase an angle of reflection of a radio wave. A liquid crystal material used in the liquid crystal layer LC of the intelligent reflecting surface RE is different from a liquid crystal material used for ordinary liquid crystal display panel.

A common voltage is applied to the common electrode CE, and the electric potential of the common electrode CE is fixed. In the present embodiment, the common voltage is 0 V. A voltage is applied to the patch electrode PE as well. In the present embodiment, the patch electrodes PE are AC-driven. The liquid crystal layer LC is driven by a so-called vertical electric field. A voltage applied between the patch electrode PE and the common electrode CE acts on the liquid crystal layer LC to change the dielectric constant of the liquid crystal layer LC.

Changes in the dielectric constant of the liquid crystal layer LC change a propagation velocity of a radio wave in the liquid crystal layer LC. Thus, the reflection phase of a radio wave can be adjusted by adjusting a voltage acting on the liquid crystal layer LC. In turn, a reflection direction of a radio wave can be adjusted. In the present embodiment, an absolute value of a voltage acting on the liquid crystal layer LC is 10 V or less. That is because the dielectric constant of the liquid crystal layer LC is saturated at 10 V. A voltage at which the dielectric constant is saturated varies depending on a value of a dielectric constant of the liquid crystal layer LC and thus an absolute value of a voltage acting on the liquid crystal layer LC can be greater than 10 V. For example, when an increase in a response speed of a liquid crystal is required, a voltage lower than or equal to 10 V may be acted on the liquid crystal layer LC after a voltage higher than 10 V acting on the liquid crystal layer LC.

The first substrate SUB1 has an incident surface Sa on an opposite side to a side opposed to the second substrate SUB2. An incident wave w1 in the figures is a radio wave to be made incident on the intelligent reflecting surface RE, and a reflected wave w2 is a radio wave reflected at the intelligent reflecting surface RE. The present first embodiment assumes 28 GHz as a frequency band of the incident wave w1.

Next, examples of the first embodiment will be described.

Example 1 of First Embodiment

Figure 2:
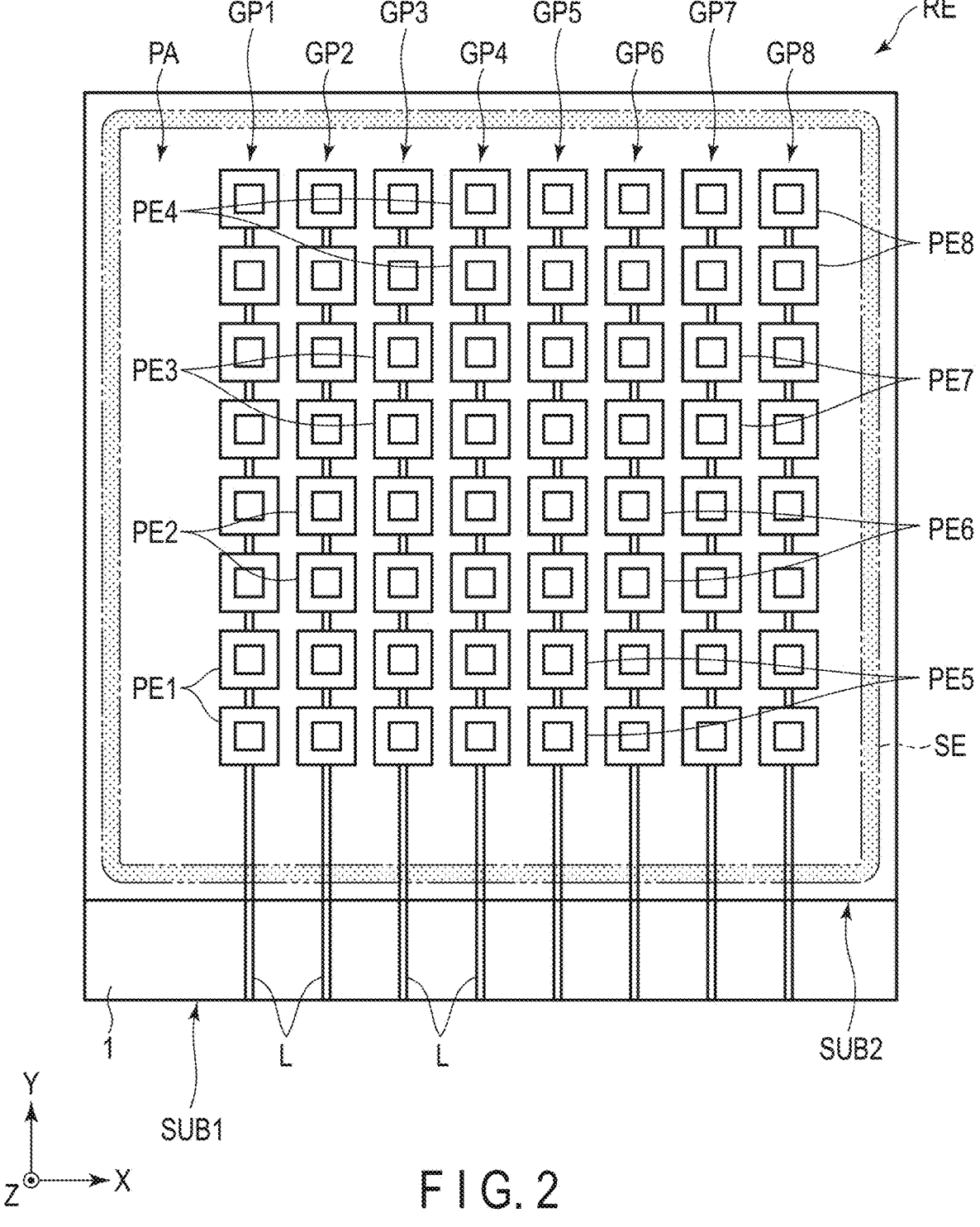
FIG. 2 is a plan view showing the intelligent reflecting surface of an example 1 of the first embodiment.

First, an example 1 of the first embodiment will be described. FIG. 2 is a plan view showing the intelligent reflecting surface RE of the example 1.

As shown in FIG. 2, the plurality of patch electrodes PE are arranged at intervals in a matrix along each of the X-axis and the Y-axis. The plurality of patch electrodes PE have the same shape and the same size in the X-Y plane.

The plurality of patch electrodes PE are arranged at regular intervals along the X-axis and the Y-axis. The plurality of patch electrodes PE are included in a plurality of patch electrode groups GP elongating along the Y-axis and arranged along the X-axis. The plurality of patch electrode groups GP include a first patch electrode group GP1 to an eighth patch electrode group GP8.

The first patch electrode group GP1 includes a plurality of first patch electrodes PE1. The second patch electrode group GP2 includes a plurality of second patch electrodes PE2. The third patch electrode group GP3 includes a plurality of third patch electrodes PE3. The fourth patch electrode group GP4 includes a plurality of fourth patch electrodes PE4. The fifth patch electrode group GP5 includes a plurality of fifth patch electrodes PE5. The sixth patch electrode group GP6 includes a plurality of sixth patch electrodes PE6. The seventh patch electrode group GP7 includes a plurality of seventh patch electrodes PE7. The eighth patch electrode group GP8 includes a plurality of eighth patch electrodes PE8. For example, the second patch electrode PE2 is located between the first patch electrode PE1 and the third patch electrode PE3 in a direction along the X-axis.

Each of the patch electrode groups GP includes a plurality of patch electrodes PE arranged along the Y-axis and electrically connected to each other. In the example 1, the patch electrodes PE in each of the patch electrode groups GP are electrically connected to each other by a connection line L. The first substrate SUB1 includes a plurality of connection lines L extending along the Y-axis and arranged along the X-axis. The connection line L elongates to an area of the basement 1 that is not opposed to the second substrate SUB2. Unlike the plurality of connection lines L in the example 1, the plurality of connection lines L may be connected to the plurality of patch electrodes PE in a one-to-one relationship.

In the example 1, the plurality of patch electrodes PE aligned along the Y-axis and the connection line L are formed integrally of the same conductor. The plurality of patch electrodes PE and the connection line L may be formed of conductors different from each other. The patch electrode PE, the connection line L, and the common electrode CE are formed of a metal or a conductor similar to a metal. The connection line L may be connected to a pad of an outer lead bonding (OLB) (not shown).

The connection line L is a fine line and has the width sufficiently smaller than a length Px1 to be described later. The width of the connection line L is several μm and is on the order of μm. In the example 1, the width of the connection line L is 5 μm. The connection line L needs to be conductive enough to sufficiently apply a control signal (voltage) to the patch electrode PE. A connection line L having a thick width leads to a decrease in a reflectivity of the reflected wave w2. The width of the connection line L should preferably be as small as possible. When the connection line L is formed by photolithography, the width of the connection line L should be small up to a limit, for example, is 1 to 2 μm. In addition, increasing width of the connection line L excessively is not desirable since an excessively large width changes a sensitivity of a frequent component of a radio wave.

The sealing material SE is arranged in a peripheral portion (square frame-shaped peripheral area PA) of an area in which the first substrate SUB1 and the second substrate SUB2 are opposed to each other.

FIG. 2 shows an example in which eight patch electrodes PE are arranged in the direction along the X-axis and the direction along the Y-axis, respectively. However, the number of the patch electrodes PE can be variously modified. For example, the number of the patch electrodes PE arranged in the direction along the X-axis may be 100 and a plurality of patch electrodes PE (for example, 100 of patch electrodes PE) may be arranged in the direction along the Y-axis direction. The length of the intelligent reflecting surface RE (first substrate SUB1) along the X-axis is 40 to 80 cm, for example.

Figure 3:
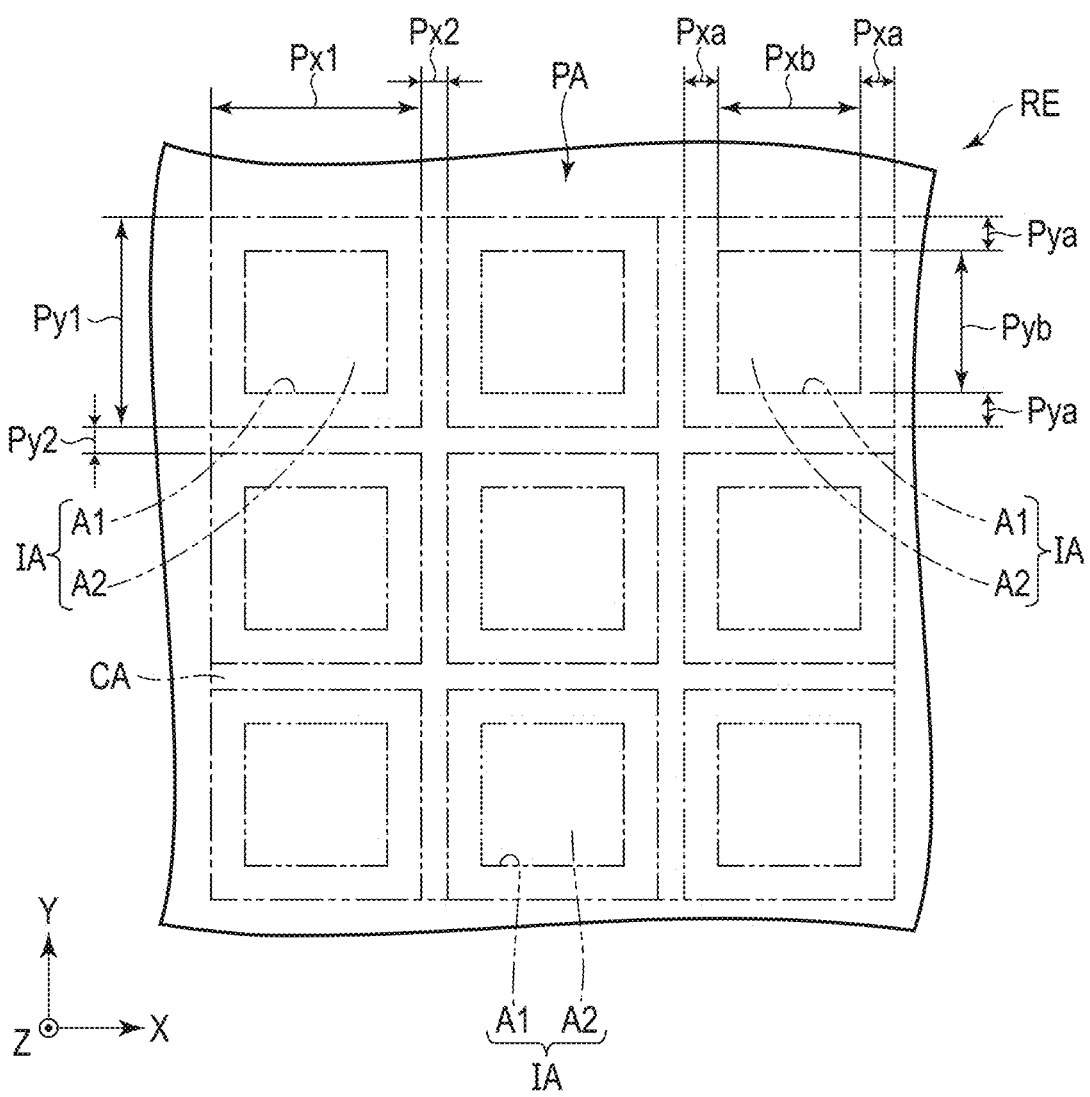
FIG. 3 is an expanded plan view showing a part of the intelligent reflecting surface of the example 1, illustrating a plurality of individual areas, a connection area, and a peripheral area.

FIG. 3 is an expanded plan view showing a part of the intelligent reflecting surface RE of the example 1, illustrating the plurality of individual areas IA, a connection area CA, and a peripheral area PA.

As shown in FIG. 3, the area in which the first substrate SUB1 and the second substrate SUB2 are opposed to each other comprises the plurality of individual areas IA, the connection area CA, and the peripheral area PA. The plurality of individual areas IA and the connection area CA are surrounded by the peripheral area PA.

The plurality of individual areas IA are arranged in a matrix along each of the X-axis and the Y-axis. Each of the individual areas IA includes a first area A1 and one or more second areas A2 other than the first area A1. The connection area CA is located in gaps between the plurality of individual areas IA, has a grating shape, and is connected to the plurality of individual areas IA.

More specifically, the first area A1 has a frame shape and includes an outer periphery having a square shape and an inner periphery having a square shape. In the first area A1, a barycenter of the outer periphery matches a barycenter of the inner periphery in plan view. Each of the individual areas IA includes a second area A2. The second area A2 is surrounded by the first area A1 and has a square shape.

The individual area IA includes a length Px1 in the direction along the X-axis and has a length Py1 in the direction along the Y-axis. An area of the connection area CA that is located between a pair of individual areas IA adjacent to each other in the direction along the X-axis has a length Px2 in the direction along the X-axis. An area of the connection area CA that is located between a pair of individual areas IA adjacent to each other in the direction along the Y-axis has a length Py2 in the direction along the Y-axis.

The first area A1 has a length Pxa in the direction along the X-axis and a length Pya in the direction along the Y-axis. The length Pxa corresponds to a distance between the outer periphery and the inner periphery opposed to each other in an area of the first area A1 that is adjacent to the second area A2 in the direction along the X-axis and extending in the direction along the Y-axis. The length Pya corresponds to a distance between the outer periphery and the inner periphery opposed to each other in an area of the first area A1 that is adjacent to the second area A2 in the direction along the Y-axis and extending in the direction along the X-axis. The second area A2 has a length Pxb in the direction along the X-axis and a length Pyb in the direction along the Y-axis.

In the example 1, each of the length Pxa and the length Pya is 250 μm (Pxa=Pya=250 μm), and each of the length Pxb and the length Pyb is 1000 μm (Pxb=Pyb=1000 μm). Thus, each of the length Px1 and the length Py1 is 1.50 mm (Px1=Py1=1.50 mm).

In addition, each of the length Px2 and the length Py2 is 50 μm (Px2=Py2=50 μm). The plurality of individual areas IA are arranged at a first pitch in the direction along the X-axis and arranged at a second pitch in the direction along the Y-axis. In the example 1, each of the first pitch and the second pitch is 1.55 mm.

Figure 4:
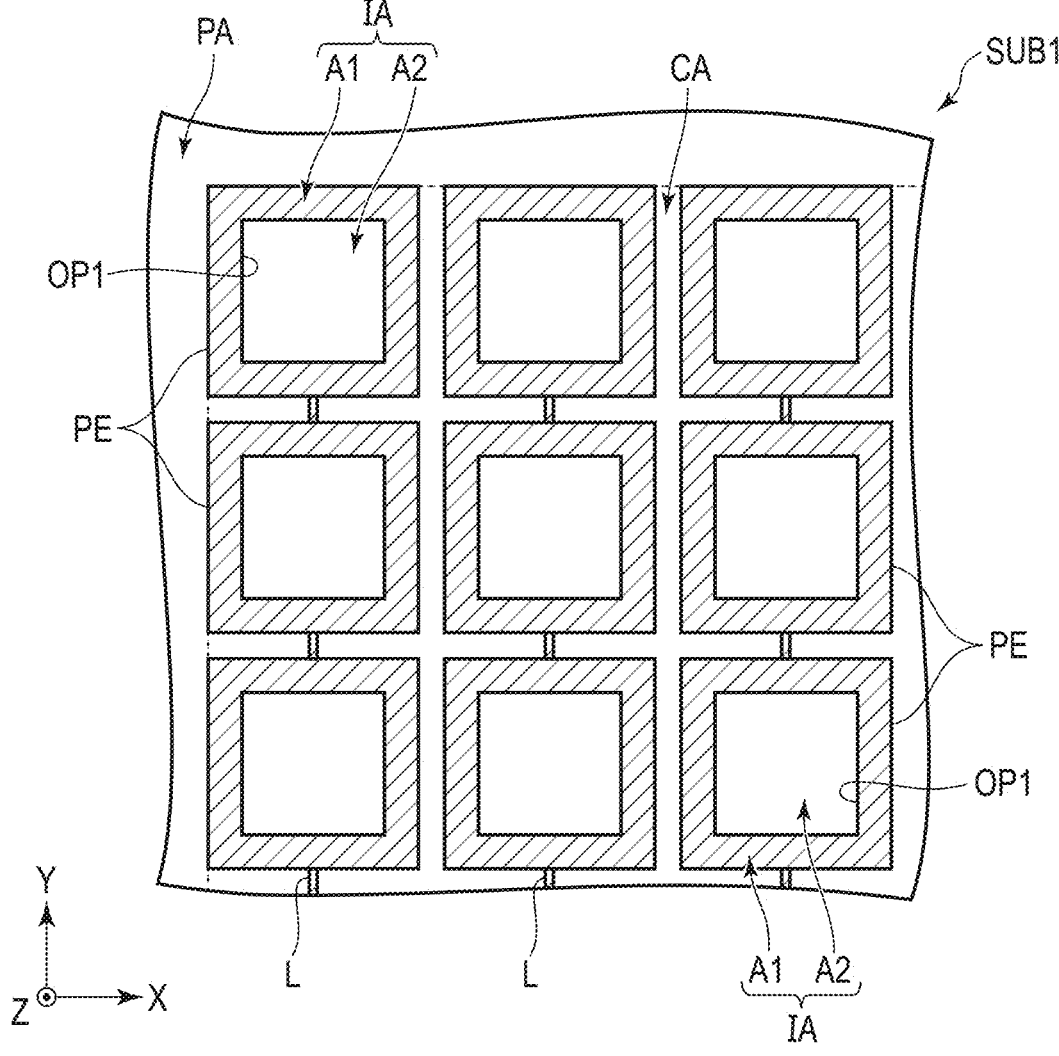
FIG. 4 is an expanded plan view showing a plurality of patch electrodes and a plurality of connection lines of the example 1.

FIG. 4 is an expanded plan view showing the plurality of patch electrodes PE and the plurality of connection lines L of the example 1.

As shown in FIG. 4, each of the patch electrodes PE has a frame shape and is located in the first area A1 of a corresponding individual area IA among the plurality of individual areas IA. In the example 1, each of the patch electrode PE is located in the entire first area A1 of a corresponding individual area IA, not in the second area A2. The patch electrode PE includes a first aperture OP1 in the second area A2. The connection line L is located in the connection area CA inside the peripheral area PA.

The shape of each of the patch electrodes PE is rotational symmetry at 90 degrees in plan view. The shape of each of the patch electrodes PE is a first shape in plan view. A second shape corresponds to the first shape that is rotated at 90 degrees in plan view. The first shape and the second shape are the same. The patch electrode PE has a square contour. The contour of the patch electrode PE (individual area IA) is not limited to the square shape in the example 1, but preferably is a shape such as a square shape or a perfect circle. When the outline of the patch electrode PE is focused, a shape with a vertical and horizontal aspect ratio of 1:1 is desirable. That is because 90 degrees rotational symmetry configuration is preferable to respond to horizontal polarized wave and vertical polarized wave.

Figure 5:
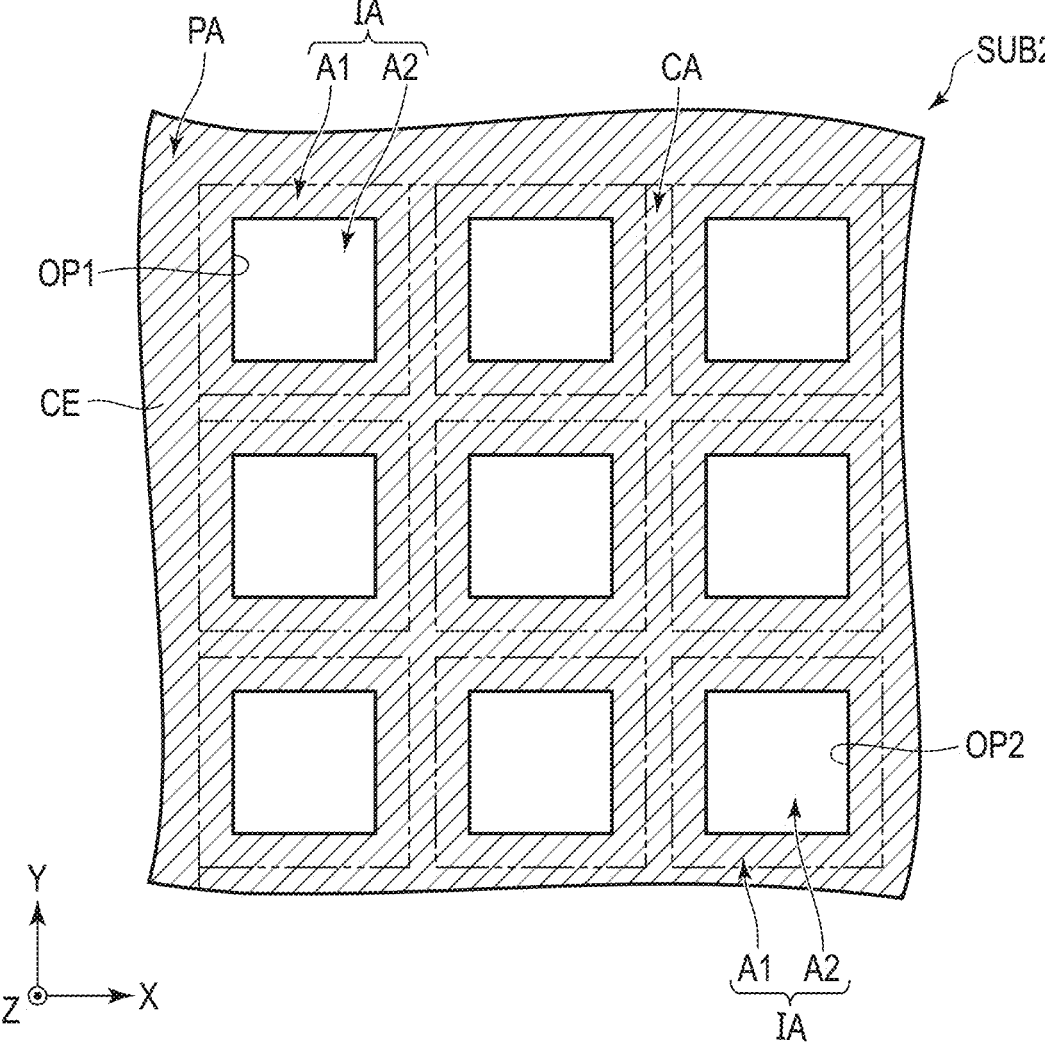
FIG. 5 is an expanded plan view showing a part of a common electrode of the example 1.

FIG. 5 is an expanded plan view showing a part of the common electrode CE of the example 1. As shown in FIG. 5, the common electrode CE is located in the plurality of individual areas IA, the connection area CA, and the peripheral area PA and is continuously provided for the plurality of individual areas IA, the connection area CA, and the peripheral area PA. In the example 1, the common electrode CE is located in the entire connection area CA. A portion of the common electrode CE that is located in each of the individual areas IA has a frame shape, is located in the entire first area A1, and is not located in the second area A2. The portion of the common electrode CE that is located in each of the individual areas IA has a second aperture OP2 in the second area A2.

The portion of the common electrode CE that is located in each of the individual areas IA has a shape rotational symmetry at 90 degrees in plan view. The portion of the common electrode CE that is located in each of the individual areas IA has a third shape in plan view. A fourth shape corresponds to the third shape that is rotated at 90 degrees in plan view. The third shape and the fourth shape are the same. In the example 1, the portion of the common electrode CE that is located in each of the individual areas IA has a square contour. The contour of the portion of the common electrode CE that is located in each of the individual areas IA is not limited to the square shape in the example 1. For example, when the contour of the patch electrode PE (individual area IA) is perfect circle, the contour of the portion of the common electrode CE that is located in each of the individual areas IA needs to be perfect circle as well.

In addition, the shape of the portion of the common electrode CE that is located in each of the individual areas IA preferably has the aspect ratio of 1:1.

As shown in FIG. 3 to FIG. 5, the shapes of portions of the patch electrode PE and the common electrode CE that are located in each of the individual areas IA are preferably rotational symmetry at 90 degrees in plan view, as described above. The shape of the portion of the common electrode CE that is located in each of the individual areas IA preferably has the same shape of each of the patch electrodes PE. The portion of the common electrode CE that is located in each of the individual areas IA preferably overlaps with a corresponding patch electrode PE among the plurality of patch electrodes PE in plan view.

In the example 1, each of the patch electrode PE, the connection line L, and the common electrode CE is formed as metals, for example, by TAT and has a light-shielding property. The TAT has a three-layer stacked structure (Ti-based/Al-based/Ti-based) and includes a lower layer formed of metal materials containing Ti (titanium) as main components such as Ti and an alloy containing Ti, a middle layer formed of metal materials containing Al (aluminum) as main components such as Al and an alloy containing Al, and an upper layer formed of metal materials containing Ti as main components such as Ti and an alloy containing Ti. Inside the peripheral area PA, the plurality of second areas A2 are areas in which the plurality of patch electrodes PE and the common electrode CE allow transmission of light (visible light). In other words, the area allowing transmission of light is first light transmissive area in which the first aperture OP1 of the patch electrode PE and the second aperture OP2 of the common electrode CE overlap with each other.

In each of the individual areas IA in the example 1, the aperture ratio is substantially 44%.

A plurality of portions of the common electrode CE that are located in the plurality of individual areas IA may be electrically connected to each other. Therefore, the common electrode CE may not be located over the entire connection area CA and may have plurality of third apertures in the connection area CA. In that case, the plurality of first light transmissive areas and plurality of second light transmissive areas overlapping with the plurality of third apertures are areas in which the plurality of patch electrodes PE and the common electrode CE allow transmission of light inside the peripheral area PA.

Figure 6:
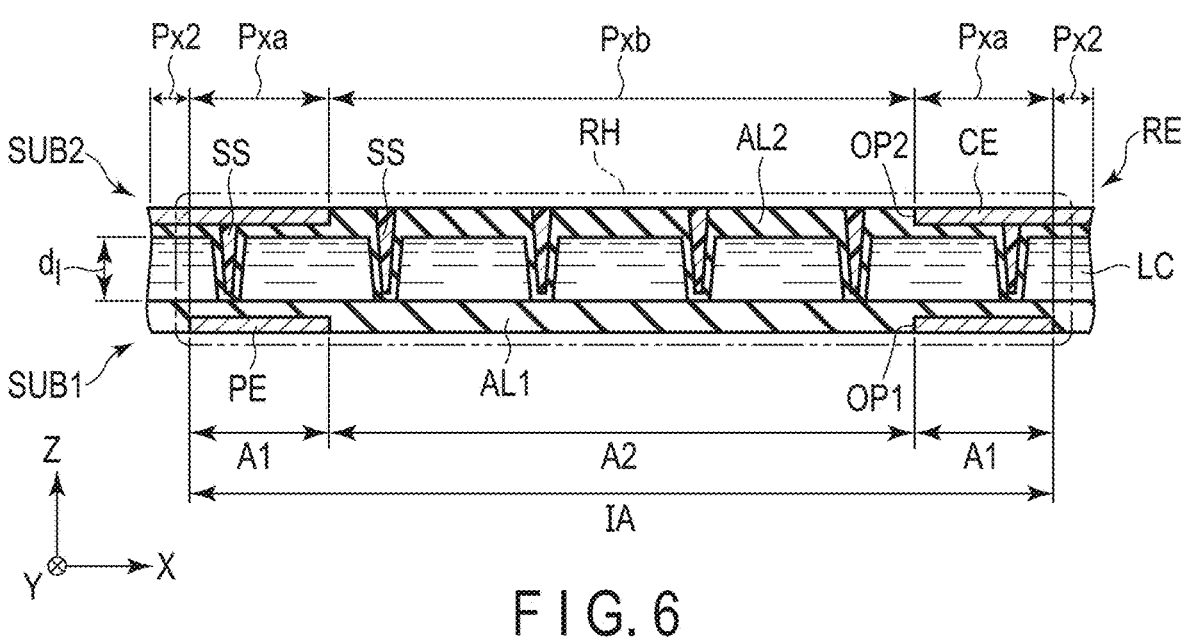
FIG. 6 is an expanded cross-sectional view showing a part of the intelligent reflecting surface of the example 1, illustrating a single reflection controller.

FIG. 6 is an expanded cross-sectional view showing a part of the intelligent reflecting surface RE of the example 1, illustrating a single reflection controller RH. In FIG. 6, illustration of the basement 1 and the like is omitted.

As shown in FIG. 6, the thickness $d_i$(cell gap) of the liquid crystal layer LC is held by a plurality of spacers SS. In the example 1, the spacer SS is a columnar spacer that is formed on the second substrate SUB2 and protrudes in the first substrate SUB1 side.

The sectional diameter of the spacer SS in the direction parallel to the X-axis is 10 to 20 μm. While a length of the patch electrode PE in the direction parallel to the X-axis and a length of the patch electrode PE in the direction parallel to the Y-xis direction are mm orders, the sectional diameter of the spacers SS in the direction parallel to the X-axis is μm orders. Therefore, the plurality of spacers SS need to be provided for areas regardless of whether the areas are opposed to the patch electrode PE. An area in which the plurality of spacers SS are provided is about 1% of the individual areas IA.

Therefore, the presence of the spacers SS in the first area A1 only slightly affects the reflected wave w2. The spacers SS may be formed on the first substrate SUB1 and may protrude in the second substrate SUB2 side. Alternatively, the spacers SS may be spherical spacers.

The intelligent reflecting surface RE comprises the plurality of reflection controllers RH. Each of the reflection controllers RH includes the patch electrode PE of the plurality of patch electrodes PE, a portion of the common electrode CE that is opposed to the patch electrode PE, and an area in the individual areas IA of the liquid crystal layer LC. In each of the reflection controllers RH, the liquid crystal layer LC is provided at least over the entire first area A1.

When a voltage is not applied between the patch electrode PE and the common electrode CE, the dielectric constant of the first area A1 in the liquid crystal layer LC is the same as that of the second area A2 in the liquid crystal layer LC. When a voltage is applied between the patch electrode PE and the common electrode CE, the dielectric constant of the first area A1 in the liquid crystal layer LC changes, whereas the dielectric constant of the second area A2 in the liquid crystal layer LC does not substantially change. The dielectric constant of the first area A1 in the liquid crystal layer LC is proportional to a voltage applied between the patch electrode PE and the common electrode CE. When a voltage is applied between the patch electrode PE and the common electrode CE, the dielectric constant of the first area A1 in the liquid crystal layer LC and that of the second area A2 in the liquid crystal layer LC are different from each other.

Figure 7:
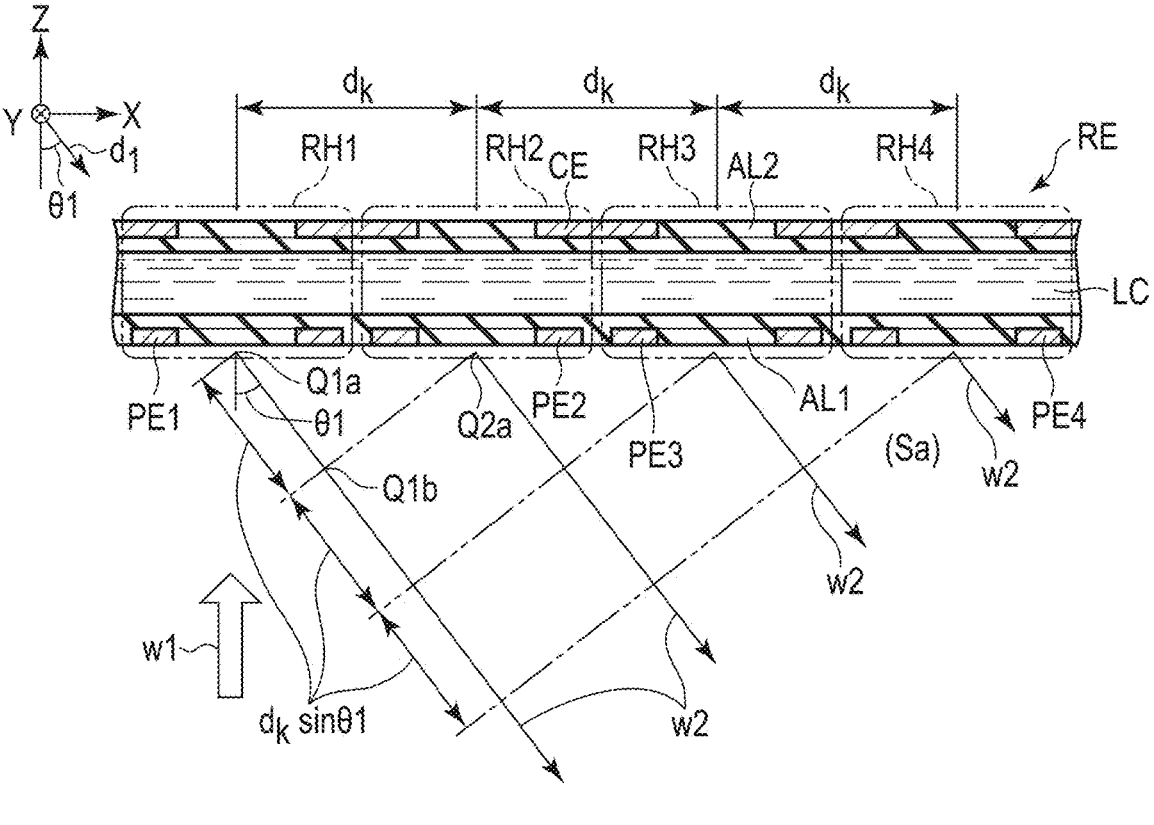
FIG. 7 is an expanded cross-sectional view showing a part of the intelligent reflecting surface of the example 1, illustrating a plurality of reflection controllers.

FIG. 7 is an expanded cross-sectional view showing a part of the intelligent reflecting surface RE of the example 1, illustrating a plurality of reflection controllers RH. In FIG. 7, illustration of the spacers SS and the like is omitted.

As shown in FIG. 7, each of the reflection controllers RH adjusts the phase of the radio wave (incident wave w1) entering from the incident surface Sa according to a voltage applied to the patch electrode PE to reflect the radio wave toward the incident surface Sa to be the reflected wave w2. In each of the reflection controller RH, the reflected wave w2 is a synthetic wave of the radio wave reflected at the patch electrode PE and the radio wave reflected at the common electrode CE.

The patch electrodes PE are arranged at regular intervals in the direction along the X-axis. A length between the patch electrodes PE adjacent to each other is a length $d_k$. The length $d_k$ corresponds to a distance from a geometric center of the patch electrode PE to a geometric center of the patch electrode PE adjacent thereto. In the example 1, the reflected waves w2 are assumed to be in the same phase in a first reflection direction d1. In the X-Z plane in FIG. 7, the first reflection direction d1 is a direction forming a first angle θ1 with the Z-axis. The first reflection direction d1 is parallel to the X-Z plane.

Radio waves reflected at the plurality of reflection controllers RH have to be in the same phase in a two-dot-chained straight line to be in the same phase in the first reflection direction d1. For example, the reflected wave w2 at a point Q1b and the reflected wave w2 at a point Q2a may be in the same phase. A physical linear dimension from the point Q1a in the first patch electrode PE to the point Q1b is $d_k \times \sin θ1$. Therefore, when the first reflection controller RH1 and the second reflection controller RH2 are focused, the phase of the reflected wave w2 from the second reflection controller RH2 may be delayed from the phase of the reflected wave w2 from the first reflection controller RH1 by a phase amount δ1. The phase amount δ1 is represented by the following equation.

$$\delta 1 = d_k \times \sin θ1 \times 2\pi / \lambda.$$

Figure 8:
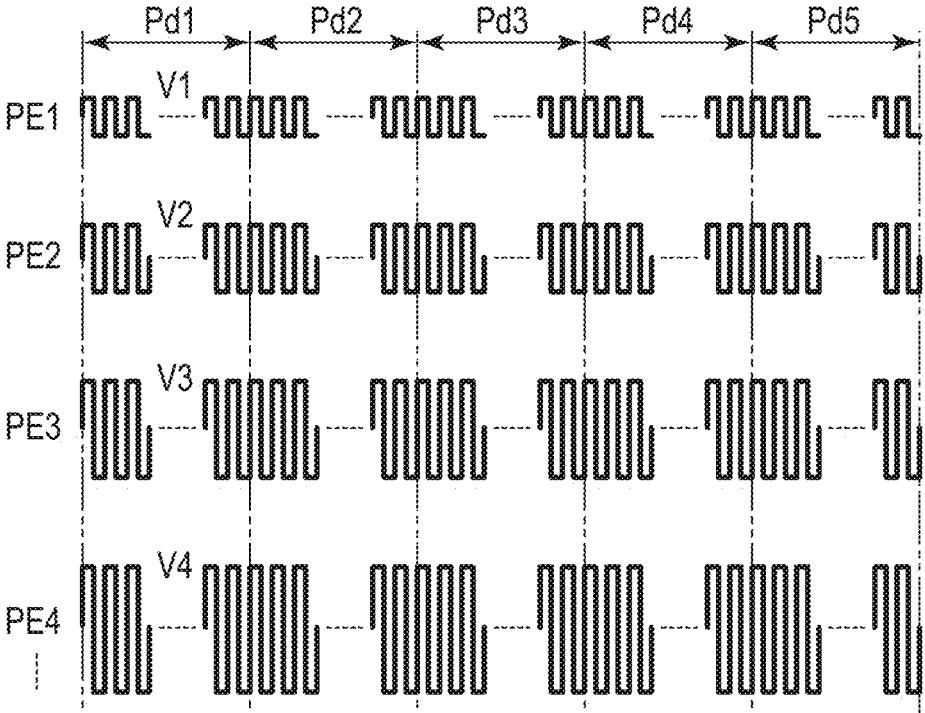
FIG. 8 is a timing chart showing changes in voltages applied to the patch electrodes for each period in a method of driving the intelligent reflecting surface of the example 1.

Next, a method of driving the intelligent reflecting surface RE will be described. FIG. 8 is a timing chart showing changes in voltages applied to the patch electrodes PE for each period in a method of driving the intelligent reflecting surface RE of the example 1. FIG. 8 shows a first period Pd1 to a fifth period Pd5 of a driving period of the intelligent reflecting surface RE.

As shown in FIG. 7 and FIG. 8, when the driving of the intelligent reflecting surface RE is started, a voltage V is applied to each of the plurality of patch electrodes PE such that radio waves reflected at the plurality of reflection controllers RH in the first period Pd1 are in the same phase in the first reflection direction d1. For example, a first voltage V1 is applied to the first patch electrode PE1, a second voltage V2 is applied to the second patch electrode PE2, a third voltage V3 is applied to the third patch electrode PE3, and a fourth voltage V4 is applied to the fourth patch electrode PE4. An absolute value of the voltage V applied to each of the patch electrodes PE is constant in the entire period Pd.

With reference to the potential of the common electrode CE, the polarity of a voltage applied to each of the patch electrodes PE is periodically inverted. For example, the patch electrode PE is driven by a drive frequency of 60 Hz. As described above, the patch electrode PE is AC-driven.

When a period Pd is changed to another period Pd, the phase amount of δ1 of the radio waves reflected by one reflection controller RH in the first reflection direction d1 and the radio waves reflected by a reflection controller RH adjacent thereto in the first reflection direction d1 is maintained. In the present embodiment, the phase amount δ1 is 30 degrees. Therefore, a phase difference of 210 degrees is provided between radio waves reflected at the first reflection controller RH1 including the first patch electrode PE1 in the first reflection direction d1 and radio waves reflected at an eighth reflection controller RH8 including the eighth patch electrode PE8 in the first reflection direction d1.

In the example 1, the intelligent reflecting surface RE can provide a phase difference of 240 degrees at maximum between radio waves reflected at one reflection controller RH in the first reflection direction d1 and radio waves reflected at another reflection controller RH in the first reflection direction d1.

In the intelligent reflecting surface RE in the example 1, the attenuation in the amplitude of the reflected waves was examined. The result of the examination shows that the attenuation in the amplitude of the reflected waves was suppressed and was −9 dB at maximum. In addition, the amplitude in a case where the radio wave is totally reflected on the intelligent reflecting surface RE is 0 dB.

Example 2 of First Embodiment

Next, an example 2 of the first embodiment will be described. FIG. 9 is an enlarged plan view showing a part of the intelligent reflecting surface RE of the example 2, illustrating the plurality of individual areas IA, the connection area CA, and the peripheral area PA.

As shown in FIG. 9, the intelligent reflecting surface RE of the example 2 is different from that of the example 1 in the shape and the dimension of the first area A1 and the shape, the dimension, and the number of the second areas A2.

The first area A1 has a square grating shape and includes a frame-shaped area A1a and a grating-shaped area A1b surrounded by and connected to the frame-shaped area A1a. The frame-shaped area A1a has a square outer periphery and a square inner periphery. In the frame-shaped area A1a, a barycenter of the outer periphery matches a barycenter of the inner periphery in plan view.

The grating-shaped area A1b includes a plurality of first liner areas A1c and a plurality of second liner areas A1d. The plurality of first liner areas A1c extend in the direction parallel to the X-axis and are arranged at intervals in the direction parallel to the Y-axis. The plurality of second liner areas A1d extend in the direction parallel to the Y-axis, are arranged at intervals in the direction parallel to the X-axis, and intersect the plurality of first liner areas A1c.

Each of the individual areas IA includes a plurality of second areas A2. The plurality of second areas A2 are surrounded by the frame-shaped area A1a, the plurality of first liner areas A1c, and the plurality of second liner areas A1d, and each have square shape.

The frame-shaped area A1a has a length Pxa1 in the direction along the X-axis and a length Pya1 in the direction along the Y-axis. The length Pxa1 corresponds to a distance between the outer periphery and the inner periphery opposed to each other in areas of the first frame-shaped area A1a extending in the direction along the Y-axis. The length Pya1 corresponds to a distance between the outer periphery and the inner periphery opposed to each other in areas of the first frame-shaped area A1a extending in the direction along the X-axis.

Each of the second liner areas A1d has a length Pxa2 in the direction along the X-axis. Each of the first liner areas A1c has a length Pya2 in the direction along the Y-axis.

Each of the second areas A2 has a length Pxb1 in the direction along the X-axis and a length Pyb1 in the direction along the Y-axis.

In the example 2, each of the length Pxa1 and the length Pya1 is 50 μm (Pxa1=Pya1=50 μm). The length Pxa1 and the length Pya1 are the same length and are selected within the range from 50 to 70 μm. Each of the length Pxa2 and the length Pya2 is 25 μm (PXa2=Pya2=25 μm). Each of the length Pxb1 and the length Pyb1 is 50 μm (Pxb1=Pyb1=50 μm). Each of the length Px1 and the length Py1 is 2.45 mm (Px1=Py1=2.45 mm).

In addition, each of the length Px2 and the length Py2 is 50 μm (Px2=Py2=50 μm). The plurality of individual areas IA are arranged at the first pitch in the direction along the X-axis and are arranged at the second pitch in the direction along the Y-axis. In the example 2, each of the first pitch and the second pitch is 2.5 mm.

FIG. 9 shows five first liner areas A1c and five second liner areas A1d in each of the individual areas IA for the sake of illustration to make segments of each of the individual areas IA clear. However, as can be understood based on the above values of the dimension, each of the individual areas IA has the first liner areas A1c more than five and the second liner areas A1d more than five.

FIG. 10 is an expanded plan view showing the plurality of patch electrodes PE and the plurality of connection lines L of the example 2.

As shown in FIG. 10, each of the patch electrodes PE has a square grating shape and is located in the first area A1 of a corresponding individual area IA among the plurality of individual areas IA. In the example 2, each of the patch electrodes PE is located in the entire first area A1 of a corresponding individual area IA, and is not located in the plurality of second areas A2. The patch electrode PE includes a first aperture OP1 in each of the second areas A2. The connection line L is located in the connection area CA inside the peripheral area PA.

As shown in FIG. 10 and FIG. 9, each of the patch electrodes PE includes a first frame-shaped electrode PEa, a plurality of first liner electrodes PEb, and a plurality of second liner electrodes PEc. The first frame-shaped electrode PEa is located in the frame-shaped area A1a and has a frame shape. The plurality of first liner electrodes PEb are located in the plurality of first liner areas A1c in a one-to-one correspondence and extend in the direction parallel to the X-axis. The plurality of second liner electrodes PEc are located in the plurality of second liner areas A1d in a one-to-one correspondence, extend in the direction parallel to the Y-axis, intersect the plurality of first liner electrodes PEb, and are formed integrally with the first frame-shaped electrode PEa and the plurality of first liner electrodes PEb.

The shape of each of the patch electrodes PE is rotational symmetry at 90 degrees in plan view. The patch electrode PE has a square contour.

FIG. 11 is an expanded plan view showing a part of the common electrode CE of the example 2. As shown in FIG. 11, the portion of the common electrode CE that is located in each of the individual areas IA has a square grating shape, is located in the entire first area A1, and is not located in the second area A2. The portion of the common electrode CE that is located in each of the individual areas IA has a second aperture OP2 in each of the second areas A2.

As show in FIG. 11 and FIG. 9, the portion of the common electrode CE that is located in each of the individual areas IA includes a second frame-shaped electrode CEa, a plurality of third linear electrodes CEb, and a plurality of fourth linear electrodes CEc. The second frame-shaped electrode CEa is located in the frame-shaped area A1a and extends in the direction parallel to the first frame-shaped electrode PEa. The plurality of third linear electrodes CEb are located in the plurality of first liner areas A1c in a one-to-one correspondence and extend in the direction parallel to the plurality of first liner electrodes PEb. The plurality of fourth linear electrodes CEc are located in the plurality of second liner areas A1d in a one-to-one correspondence, extend in the direction parallel to the plurality of second liner electrodes PEc, intersect the plurality of third linear electrodes CEb, and are formed integrally with the second frame-shaped electrode CEa and the plurality of third linear electrodes CEb.

The portion of the common electrode CE that is located in each of the individual areas IA has a shape rotational symmetry at 90 degrees in plan view. In the example 2, the portion of the common electrode CE located in each of the individual areas IA has a square contour.

As shown in FIG. 9 to FIG. 11, inside the peripheral area PA, the plurality of second areas A2 are areas in which the plurality of patch electrodes PE and the common electrode CE allow transmission of light (visible light). In other words, the areas in which transmission of light (visible light) is allowed are the plurality of first light transmissive areas in which the plurality of first apertures OP1 of the patch electrode PE and the plurality of second apertures OP2 of the common electrode CE overlap with each other.

In each of the individual areas IA in the example 2, the aperture ratio is approximately 40%.

In the example 2, the intelligent reflecting surface RE can provide a phase difference of 290 degrees at maximum between radio waves reflected at one reflection controller RH in the first reflection direction d1 and radio waves reflected at another reflection controller RH in the first reflection direction d1.

In the intelligent reflecting surface RE in the example 2, the attenuation in the amplitude of the reflected waves was examined. The result of the examination shows that the attenuation in the amplitude of the reflected waves was suppressed and was −9 dB at maximum.

Example 3 of First Embodiment

Next, an example 3 of the first embodiment will be described. The intelligent reflecting surface RE of the example 3 is different from that of the example 2 in the shape and the dimension of the individual areas IA.

As shown in FIG. 9, in the example 3, each of the length Pxa1 and the length Pya1 is 50 μm (Pxa1=Pya1=50 μm). The length Pxa1 and the length Pya1 are the same length and are selected within the range from 50 to 70 μm. Each of the length Pxa2 and the length Pya2 is 30 μm (PXa2=Pya2=30 μm). Each of the length Pxb1 and the length Pyb1 is 150 μm (Pxb1=Pyb1=150 μm). Each of the length Px1 and the length Py1 is 2.15 mm (Px1=Py1=2.15 mm).

In addition, each of the length Px2 and the length Py2 is 50 μm (Px2=Py2=50 μm). The plurality of individual areas IA are arranged at the first pitch in the direction along the X-axis and are arranged at the second pitch in the direction along the Y-axis. In the example 3, each of the first pitch and the second pitch is 2.2 mm.

In each of the individual areas IA in the example 3, the aperture ratio is approximately 60%.

In the example 3, the intelligent reflecting surface RE can provide a phase difference of 270 degrees at maximum between radio waves reflected at one reflection controller RH in the first reflection direction d1 and radio waves reflected at another reflection controller RH in the first reflection direction d1.

In the intelligent reflecting surface RE in the example 3, the attenuation in the amplitude of the reflected waves was examined. The result of the examination shows that the attenuation in the amplitude of the reflected waves was suppressed and was −9 dB at maximum.

Example 4 of First Embodiment

Next, an example 4 of the first embodiment will be described. The intelligent reflecting surface RE of the example 4 is different from that of the example 2 in the shape and the dimension of the individual areas IA.

As shown in FIG. 9, in the example 4, each of the length Pxa1 and the length Pya1 is 50 μm (Pxa1=Pya1=50 μm). The length Pxa1 and the length Pya1 are the same length and are selected within the range from 50 to 70 μm. Each of the length Pxa2 and the length Pya2 is 25 μm (PXa2=Pya2=25 μm). Each of the length Pxb1 and the length Pyb1 is 25 μm (Pxb1=Pyb1=25 μm). Each of the length Px1 and the length Py1 is 2.55 mm (Px1=Py1=2.55 mm).

In addition, each of the length Px2 and the length Py2 is 50 μm (Px2=Py2=50 μm). The plurality of individual areas IA are arranged at the first pitch in the direction along the X-axis and are arranged at the second pitch in the direction along the Y-axis. In the example 3, each of the first pitch and the second pitch is 2.6 mm.

In each of the individual areas IA in the example 4, the aperture ratio is approximately 23%.

In the example 4, the intelligent reflecting surface RE can provide a phase difference of 180 degrees at maximum between radio waves reflected at one reflection controller RH in the first reflection direction d1 and radio waves reflected at another reflection controller RH in the first reflection direction d1.

In the intelligent reflecting surface RE in the example 4, the attenuation in the amplitude of the reflected waves was examined. The result shows that the attenuation in the amplitude of the reflected waves was suppressed and was −2.5 dB at maximum.

Example 5 of First Embodiment

Next, an example 5 of the first embodiment will be described. FIG. 12 is a view showing a part of the intelligent reflecting surface RE of the example 5, illustrating the plurality of individual areas IA, the connection area CA, and the peripheral area PA.

As shown in FIG. 12, the intelligent reflecting surface RE of the example 5 is different from that of the example 1 in the shape and the dimension of the first area A1 and the shape, dimension, and the number of second areas A2. The first area A1 has a cross shape and includes the first liner area A1c and the second liner areas A1d. The first liner area A1c extends in the direction parallel to the X-axis. The second liner area A1d extends in the direction parallel to the Y-axis and intersects the first liner area A1c.

Each of the individual areas IA includes the plurality of second areas A2. The plurality of second areas A2 are surrounded by the first area A1 and the connection area CA or surrounded by the first area A1, the connection area CA, and the peripheral area PA, and have square shapes.

The second liner area A1d has the length Pxa2 in the direction along the X-axis. The first liner area A1c has the length Pya2 in the direction along the Y-axis.

Each of the second areas A2 has the length Pxb1 in the direction along the X-axis and the length Pyb1 in the direction along the Y-axis.

In the example 5, each of the length Pxa2 and the length Pya2 is 1000 μm (Pxa2=Pya2=1000 μm). Each of the length Pxb1 and the length Pyb1 is 1000 μm (Pxb1=Pyb1=1000 μm). Each of the length Px1 and the length Py1 is 3.0 mm (Px1=Py1=3.0 mm).

In addition, each of the length Px2 and the length Py2 is 50 μm (Px2=Py2=50 μm). The plurality of individual areas IA are arranged at the first pitch in the direction along the X-axis and are arranged at the second pitch in the direction along the Y-axis. In the example 5, each of the first pitch and the second pitch is 3.05 mm.

FIG. 13 is an expanded plan view showing the plurality of patch electrodes PE and the plurality of connection lines L of the example 5.

As shown in FIG. 13, each of the patch electrodes PE has a cross shape and is located in the first area A1 of a corresponding individual area IA among the plurality among individual areas IA. In the example 5, each of the patch electrodes PE is located in the entire first area A1 of a corresponding individual area IA, and is not located in the plurality of second areas A2.

As shown in FIG. 13 and FIG. 12, each of the patch electrodes PE includes the first liner electrode PEb and the second liner electrode PEc. The first liner electrode PEb is located in the first liner area A1c and extends in the direction parallel to the X-axis. The second liner electrode PEc is located in the second liner area A1d, extends in the direction parallel to the Y-axis, intersects the first liner electrode PEb, and is formed integrally with the first liner electrode PEb.

The shape of each of the patch electrodes PE is rotational symmetry at 90 degrees in plan view.

FIG. 14 is an expanded plan view showing a part of the common electrode CE of the example 5. As shown in FIG. 14, the portion of the common electrode CE that is located in each of the individual areas IA has a cross shape, is located in the entire first area A1, and is not located in the second area A2.

As show in FIG. 14 and FIG. 12, the portion of the common electrode CE that is located in each of the individual areas IA includes the third linear electrode CEb and the fourth linear electrode CEc. The third linear electrode CEb is located in the first liner area A1c and extends in the direction parallel to the plurality of first liner electrodes PEb. The fourth linear electrode CEc is located in the plurality of second liner areas A1d, extends in the direction parallel to the second liner electrode PEc, intersects the third linear electrode CEb, and is formed integrally with the third linear electrode CEb. The portion of the common electrode CE that is located in each of the individual areas IA has a shape rotational symmetry at 90 degrees in plan view.

In the example 5, the plurality of third linear electrodes CEb arranged in the direction parallel to the X-axis are connected to and formed integrally with each other in the connection area CA. The plurality of fourth linear electrodes CEc arranged in the direction parallel to the Y-axis are connected to and formed integrally with each other in the connection area CA.

As shown in FIG. 12 and FIG. 14, inside the peripheral area PA, areas in which the plurality of patch electrodes PE and the common electrode CE allow transmission of light (visible light) are the plurality of second areas A2 and areas of the connection area CA in which the common electrode CE is not formed. In other words, the areas in which transmission of light (visible light) is allowed are the plurality of first light transmissive areas overlapping with the plurality of second areas A2 and the plurality of second light transmissive areas of the connection area CA in which the common electrode CE is not formed.

In each of the individual areas IA in the example 5, the aperture ratio is approximately 44%.

In the example 5, the intelligent reflecting surface RE can provide a phase difference of 240 degrees at maximum between radio waves reflected at one reflection controller RH in the first reflection direction d1 and radio waves reflected at another reflection controller RH in the first reflection direction d1.

In the intelligent reflecting surface RE in the example 5, the attenuation in the amplitude of the reflected waves was examined. The result of the examination shows that the attenuation in the amplitude of the reflected waves was suppressed and was −9 dB at maximum.

According to the intelligent reflecting surface RE of the first embodiment configured in the above manner, the intelligent reflecting surface RE comprises the plurality of reflection controllers RH. The radio wave in 28 GHz band used in 5G (fifth generation mobile communication system) have strong linearity and thus, in a case where there is a shielding object, a communication environment is impaired (coverage hall). Thus, a measure such as arranging the intelligent reflecting surface RE to use a reflected wave w2 can be adopted. The intelligent reflecting surface RE, which can control the direction of the reflected wave w2, can handle a change in the radio wave environment.

Each of the reflection controllers RH includes an area in which transmission of light (visible light) is allowed in the individual area IA. In other words, the individual area IA has an area in which both of the patch electrode PE and the common electrode CE are not formed. The intelligent reflecting surface RE can cause visible light to be transmitted in the second area A2. The intelligent reflecting surface RE can match with its surrounding when being provided. For example, one can see the surrounding behind the intelligent reflecting surface RE through the intelligent reflecting surface RE.

Thus, the intelligent reflecting surface RE having excellent light transmitting property can be provided.

When the incident wave w1 is assumed to have the frequency band of 28 GHz, patterns of the patch electrode PE and the common electrode CE in the individual area IA are not specified and can be modified variously as listed as examples in the example 1 to the example 5. For example, among the example 1 to the example 5, the example 1 has the smallest pitch of the plurality of individual areas IA. Therefore, the example 1 is effective for high definition of the plurality of reflection controllers RH.

In contrast, among the example 1 to the example 5, the example 5 has the largest pitch of the plurality of individual areas IA. Therefore, the example 5 is effective for upsizing the intelligent reflecting surface RE.

Modified Example of First Embodiment

Figure 15:
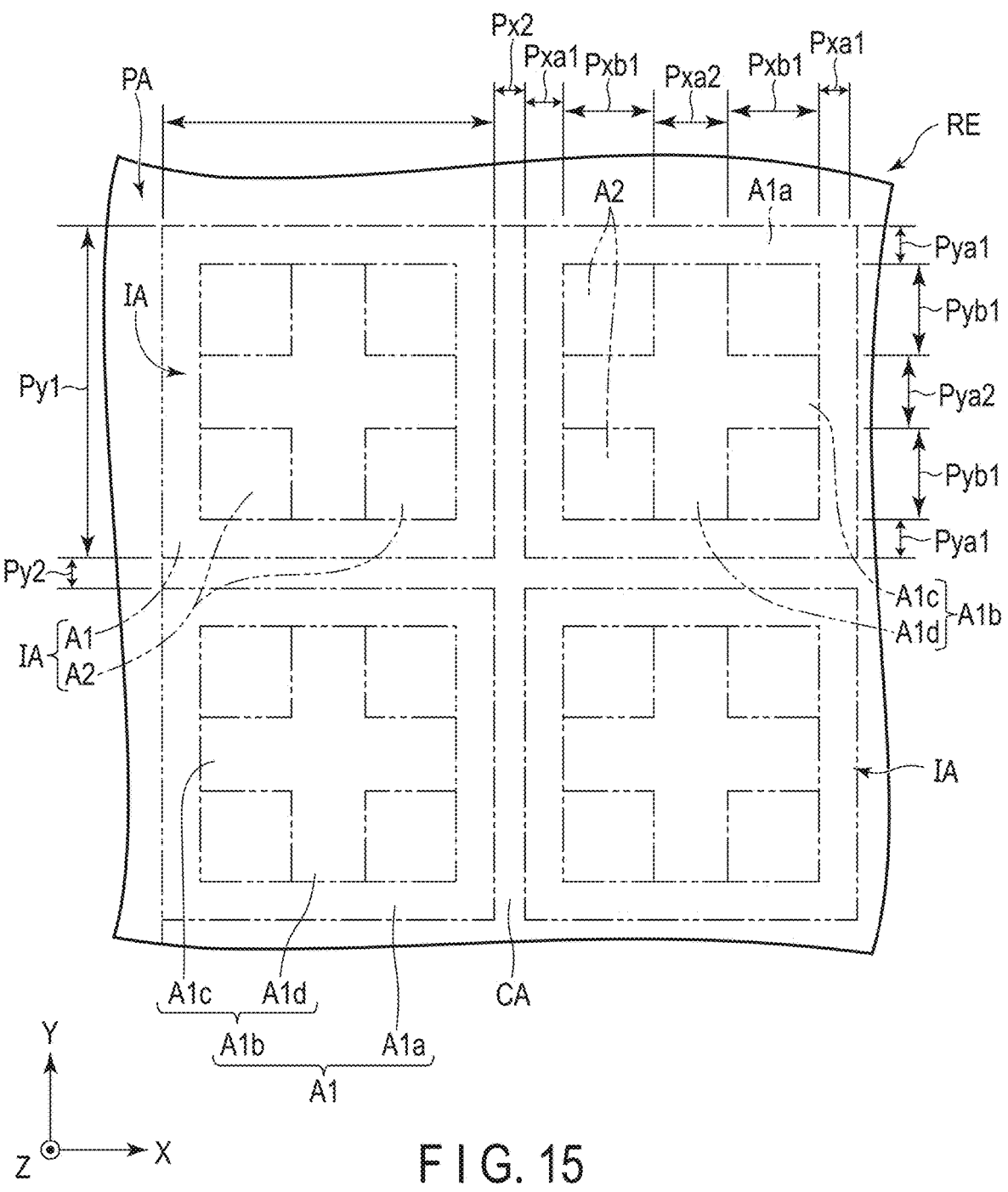
FIG. 15 is an expanded plan view showing a part of the intelligent reflecting surface of a modified example of the first embodiment, illustrating the plurality of individual areas, the connection area, and the peripheral area.

Next, a modified example of the first embodiment will be described. FIG. 15 is an expanded plan view showing a part of the intelligent reflecting surface RE of the present modified example, illustrating the plurality of individual areas IA, the connection area CA, and the peripheral area PA.

As shown in FIG. 15, the intelligent reflecting surface RE of the present modified example is different from that of the example 2 in the shape of the first area A1 and the number of the second areas A2.

The first area A1 includes the frame-shaped area A1$a$, the first liner area A1$c$, and the second liner area A1$d$. The plurality of second areas A2 are surrounded by the frame-shaped area A1$a$, the first liner area A1$c$, and the second liner area A1$d$ and each have square shape.

FIG. 16 is an expanded plan view showing the plurality of patch electrodes PE and the plurality of connection lines L of the present modified example. As shown in FIG. 16, each of the patch electrodes PE is located in the first area A1 of a corresponding individual area IA among the plurality of individual areas IA. In the present modified example, each of the patch electrodes PE is located in the entire frame-shaped area A1$a$ of a corresponding individual area IA, a part of the first liner area A1$c$, and a part of the second liner area A1$d$, and is not located in the plurality of second areas A2.

As shown in FIG. 16 and FIG. 15, each of the patch electrodes PE includes the first frame-shaped electrode PEa, the plurality of first liner electrodes PEb, and the plurality of second liner electrodes PEc. In the present modified example, each of the patch electrodes PE includes three first liner electrodes PEb and three second liner electrodes PEc.

The plurality of first liner electrodes PEb are located in the first liner area A1$c$, extend in the direction parallel to the X-axis, and are arranged at the intervals in the direction parallel to the Y-axis. The plurality of second liner electrodes PEc are located in the second liner area A1$d$, extend in the direction parallel to the Y-axis, arranged at the intervals in the direction parallel to the X-axis, intersect the plurality of first liner electrodes PEb, and are formed integrally with the first frame-shaped electrode PEa and the plurality of first liner electrodes PEb.

The shape of each of the patch electrodes PE is rotational symmetry at 90 degrees in plan view. The patch electrode PE has a square contour.

FIG. 17 is an expanded plan view showing a part of the common electrode CE of the present modified example. As shown in FIG. 17, the portion of the common electrode CE that is located in each of the individual areas IA is located in the entire frame-shaped area A1$a$, a part of the first liner area A1$c$, and a part of the second liner area A1$d$, and is not located in the plurality of second areas A2.

As show in FIG. 17 and FIG. 15, the portion of the common electrode CE that is located in each of the individual areas IA includes the second frame-shaped electrode CEa, the plurality of third linear electrodes CEb, and the plurality of fourth linear electrodes CEc. In the present modified example, the portion of the common electrode CE that is located in each of the individual areas IA includes three third linear electrodes CEb and three fourth linear electrodes CEc.

The plurality of third linear electrodes CEb are located in the first liner area A1$c$ and extend in the direction parallel to the plurality of first liner electrodes PEb. In plan view, each of the third linear electrodes CEb overlaps with a corresponding first liner electrode PEb.

The plurality of fourth linear electrodes CEc are located in the plurality of second liner areas A1$d$, extend in the direction parallel to the plurality of second liner electrodes PEc, intersect the plurality of third linear electrodes CEb, and are formed integrally with the second frame-shaped electrode CEa and the plurality of third linear electrodes CEb. In plan view, each of the fourth linear electrodes CEc overlaps with a corresponding second liner electrode PEc.

The portion of the common electrode CE that is located in each of the individual areas IA has a shape of rotational symmetry at 90 degrees in plan view.

As shown in FIG. 15 to FIG. 17, inside the peripheral area PA, areas in which the plurality of patch electrodes PE and the common electrode CE allow transmission of light (visible light) are the plurality of second areas A2, and areas of each of the first areas A1 in which the plurality of first liner electrodes PEb, the plurality of second liner electrodes PEc, the plurality of third linear electrodes CEb, and the plurality of fourth linear electrodes CEc are not formed.

The present modified example can achieve the advantages similar to that of the first embodiment.

Second Embodiment

Next, a second embodiment will be described. An intelligent reflecting surface RE of the second embodiment is constituted similarly to the above-described example 1 of first embodiment except for constituent elements described in the second embodiment. FIG. 18 is a plan view showing the intelligent reflecting surface RE of the present embodiment. In FIG. 18, a dot pattern is added to a sealing material SE, and a plurality of patch electrodes PE are represented by hatch lines.

As shown in FIG. 18, a first substrate SUB1 includes a plurality of signal lines SL, a plurality of control lines GL, a plurality of switching elements SW, a drive circuit DR, a drive circuit DC, and a plurality of lead lines LE, instead of a connection line L and a wiring line WL.

The plurality of signal lines SL elongate along the Y-axis and are arranged in the direction along the X-axis. The signal lines SL are connected to the drive circuit DC. The plurality of control lines GL elongate along the X-axis and are arranged in the direction along the Y-axis. The signal line SL and the control line GL elongate in an area surrounded by the peripheral area PA. The drive circuit DR is located in the peripheral area PA. The plurality of control lines GL are connected to the drive circuit DR.

The switching element SW is provided in the vicinity of an intersection of the signal line SL and the control line GL and is electrically connected to the signal line SL and the control line GL. One end of each of the plurality of lead lines LE is connected to the drive circuit DR. The other end of each of the plurality of lead lines LE is connected to a pad p of OLB. The lead line LE may be connected to the drive circuit DC.

FIG. 19 is an expanded sectional view showing a part of the intelligent reflecting surface RE of the second embodiment. As shown in FIG. 19, an insulating layer 11, an insulating layer 12, an insulating layer 13, an insulating layer 14, an insulating layer 15, an insulating layer 16, an insulating layer 17, and an alignment film AL1 are formed on a basement 1 in this order. The insulating layers 11 to 17 are inorganic insulating layers or organic insulating layers. In the present embodiment, the insulating layer 16 is an organic insulating layer and is formed of resin, for example.

The insulating layers 11 to 15, and 17 are inorganic insulating layers. The insulating layer 11 is formed of silicon oxide (SiO). The insulating layer 12 includes a lower layer formed of silicon nitride (SiN) and an upper layer formed of SiO. The insulating layer 13 is formed of SiO. The insulating layer 14 is formed of SiN. The insulating layer 15 is formed of SiO or SiN. The insulating layer 17 is formed of SiN.

The control line GL and a conductive layer CO1 are provided on the insulating layer 11 and are covered with the insulating layer 12. A semiconductor layer SMC is provided on the insulating layer 12. The semiconductor layer SMC overlaps with the control line GL. The semiconductor layer SMC is formed of an oxide semiconductor (OS), which is a transparent semiconductor. Typical examples of the oxide semiconductor are indium-gallium-zinc oxide (IGaZnO), indium gallium oxide (InGaO), indium zinc oxide (InZnO), zinc tin oxide (ZnSnO), zinc oxide (ZnO), transparent amorphous oxide semiconductor (TAOS), and the like. The semiconductor layer SMC is not limited to the oxide semiconductor and may be formed of amorphous silicon or low-temperature polycrystalline silicon as polycrystalline silicon.

A conductive layer CO2 and a connection line layer CL1 are provided on the insulating layer 12 and the semiconductor layer SMC and are covered with the insulating layer 13. The connection line layer CL1 is in contact with the conductive layer CO1 through a contact hole formed in the insulating layer 12. The conductive layer CO2 and the connection line layer CL1 are in contact with and electrically connected to the semiconductor layer SMC. One of an area of the semiconductor layer SMC to which the conductive layer CO2 is connected and an area of the semiconductor layer SMC to which the connection line layer CL1 is connected, is a source area, and the other is a drain area. The semiconductor layer SMC includes a channel area between the source area and the drain area.

A gate electrode GE is provided on the insulating layer 13 and is covered with the insulating layer 14. The gate electrode GE is electrically connected to the control line GL. The gate electrode GE overlaps with at least the channel area of the semiconductor layer SMC. The control lines GL, the semiconductor layer SMC, the gate electrode GE, and the like constitute the switching element SW as a thin-film transistor (TFT).

An area of the control line GL that overlaps with the semiconductor layer SMC function as the gate electrode. Thus, the switching element SW is a dual-gate TFT. However, the switching element SW may be a bottom-gate TFT or a top-gate TFT.

A conductive layer CO3 and a connection line layer CL2 are provided on the insulating layer 14 and are covered with the insulating layer 15. The conductive layer CO3 is in contact with the gate electrode GE through a contact hole formed in the insulating layer 14. The connection line layer CL2 is in contact with the connection line layer CL1 through contact holes formed in the insulating layer 13 and the insulating layer 14.

The insulating layers 16 and 17 are provided on the insulating layer 15 in this order. The patch electrode PE is located on the insulating layer 17 and is covered with the alignment film AL1. The patch electrode PE is in contact with the connection line layer CL2 through contact holes formed in the insulating layers 15, 16, and 17.

A common electrode CE and an alignment film AL2 are provided on a surface of a basement 2 that is opposed to the first substrate SUB1 in this order.

The control line GL, the conductive layers CO1, CO2, and CO3, the connection line layers CL1 and CL2, and the gate electrode GE are formed of metal as a low resistance conductive material. The control line GL and the gate electrode GE may be formed of molybdenum (Mo), tungsten (W), or alloys thereof. The connection line layers CL1 and CL2 may be formed of TAT or MAM.

The MAM has a three-layer stacked structure (Mo-based/Al-based/Mo-based) constituted by a lower layer formed of Mo or a metal material containing Mo as a main component such as an alloy containing Mo, an intermediate layer formed of Al or a metal material containing Al as a main component such as an alloy containing Al, and an upper layer formed of Mo or a metal material containing Mo as a main component such as an alloy containing Mo.

As shown in FIG. 18 and FIG. 19, the plurality of patch electrodes PE can be individually driven by active matrix driving. Therefore, the plurality of patch electrodes PE can be independently driven. For example, the direction of the reflected wave w2 reflected at the intelligent reflecting surface RE can be the direction parallel to the Y-Z plane.

Alternatively, the direction of the reflected wave w2 reflected at the intelligent reflecting surface RE can be the direction parallel to a third plane other than the X-Z plane and the Y-Z plane. The third plane is defined by the Z-axis and a third axis other than the X-axis and the Y-axis of the X-Y plane.

Figure 20:
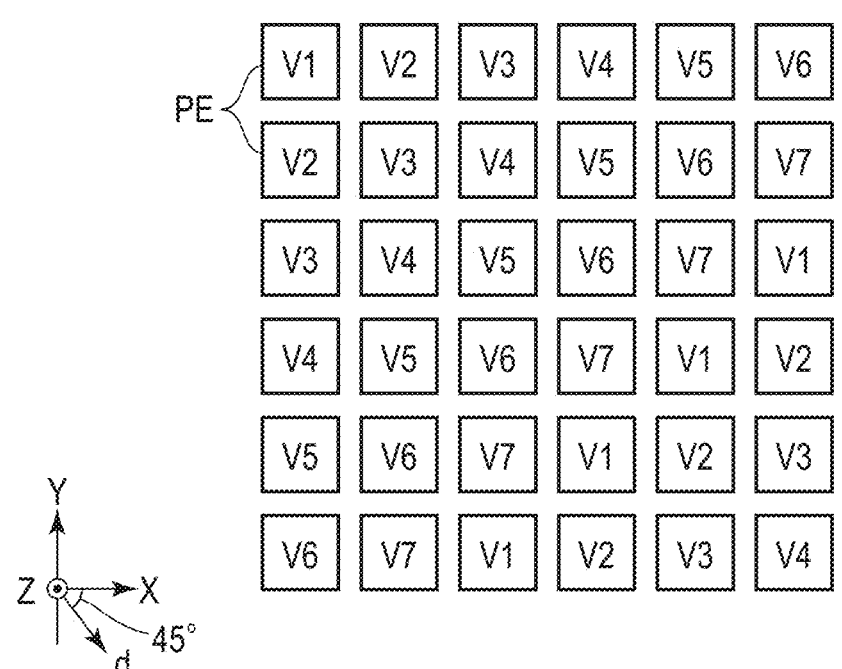
FIG. 20 is an expanded plan view showing a plurality of patch electrodes of the second embodiment, illustrating an example of voltages applied to the plurality of patch electrodes in a method of driving the intelligent reflecting surface.

FIG. 20 is an expanded plan view showing the plurality of patch electrodes PE of the second embodiment, illustrating an example of voltages applied to the plurality of patch electrodes PE in the method of driving the intelligent reflecting surface RE. As shown in FIG. 20, a reflection direction d of the reflected wave w2 reflected at the intelligent reflecting surface RE can be inclined in the lower right direction at 45 degrees. A first voltage V1, a second voltage V2 . . . a seventh voltage V7 are applied to the patch electrodes PE.

Figure 21:
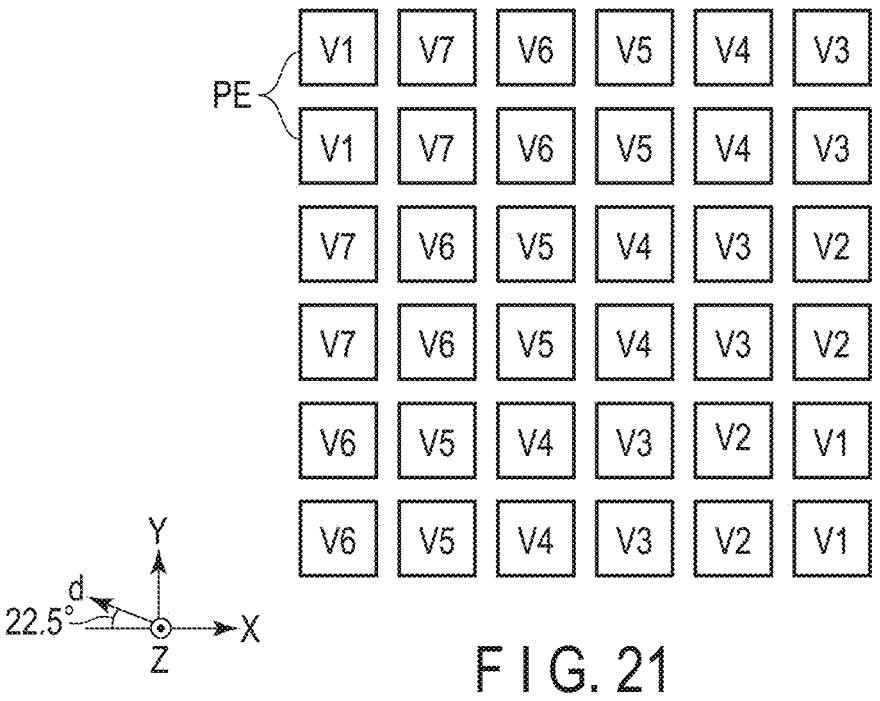
FIG. 21 is an expanded plan view showing the plurality of patch electrodes of the second embodiment, illustrating another example of voltages applied to the plurality of patch electrodes in the method of driving the intelligent reflecting surface.

FIG. 21 is an expanded plan view showing the plurality of patch electrodes PE of the second embodiment, illustrating another example of voltages applied to the plurality of patch electrodes PE in the method of driving the intelligent reflecting surface RE. As shown in FIG. 21, the reflection direction d of the reflected wave w2 reflected at the intelligent reflecting surface RE can be inclined in the upper left direction at 22.5 degrees. A first voltage V1, a second voltage V2 . . . a seventh voltage V7 are applied to the patch electrodes PE.

The same advantages as those of the above-described example 1 of the first embodiment can also be obtained from the second embodiment configured as described above. Each of the patch electrodes PE can be independently driven, increasing the degree of freedom in the reflection direction d of the reflected wave w2 reflected at the intelligent reflecting surface RE.

Modified Example of Second Embodiment

Next, a modified example of the second embodiment will be described. The modified example of the second embodiment is common to the example 5 (FIG. 12) of the first embodiment with respect to the plurality of individual areas IA, the connection area CA, and the peripheral area PA.

Figure 22:
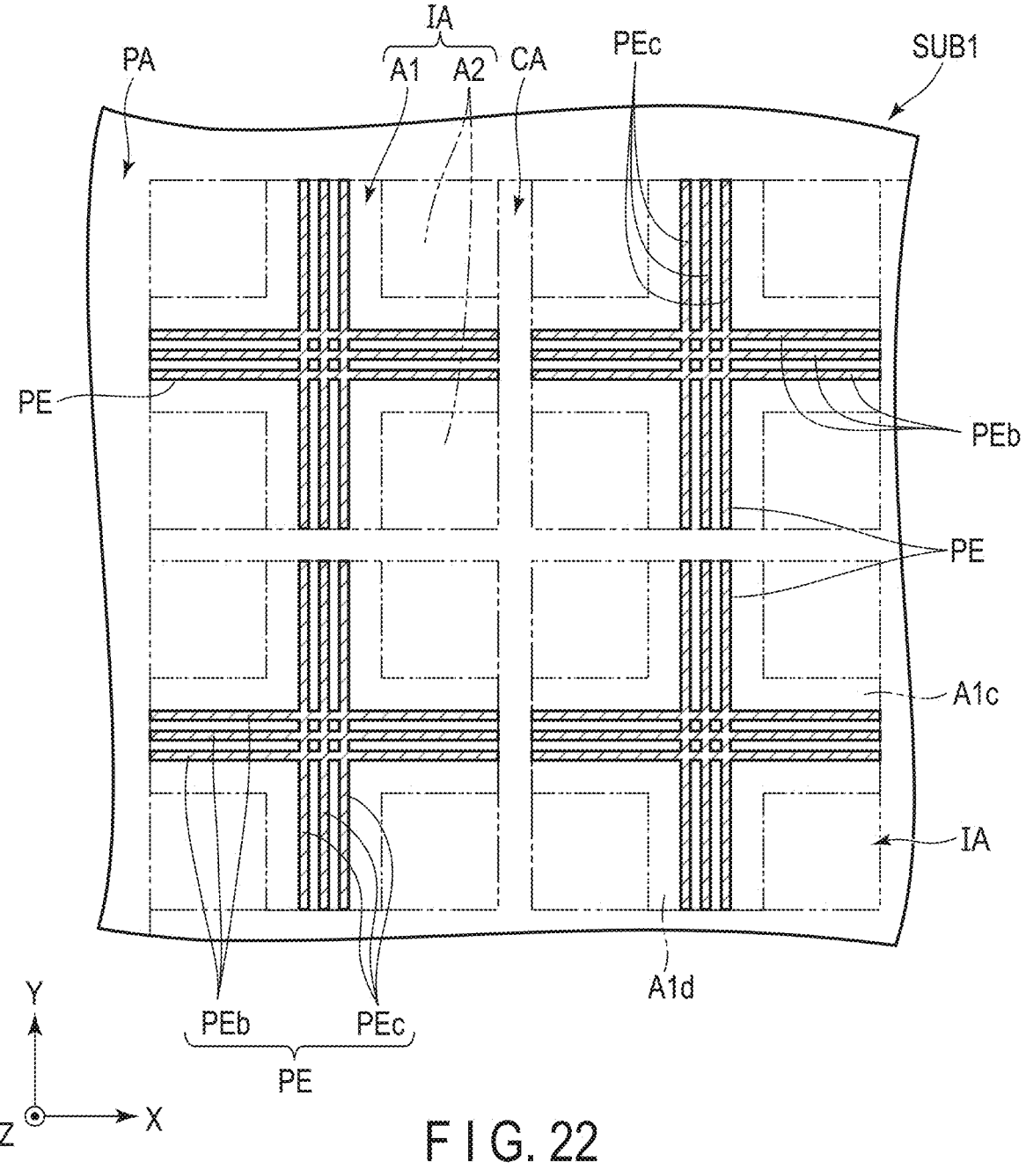
FIG. 22 is an expanded plan view showing the plurality of patch electrodes of the intelligent reflecting surface of a modified example of the second embodiment.

FIG. 22 is an expanded plan view showing the plurality of patch electrodes PE of the intelligent reflecting surface RE of the present modified example. As shown in FIG. 22, the first area A1 has a cross shape and includes a first liner area A1c extending in the direction parallel to the X-axis and a second liner area A1d extending in the direction parallel to the Y-axis and intersecting the first liner area A1c.

Each of the patch electrodes PE includes a plurality of first liner electrodes PEb and a plurality of second liner electrodes PEc. The plurality of first liner electrodes PEb are located in the first liner area A1c, extend in the direction parallel to the X-axis, and are arranged at the intervals in the direction parallel to the Y-axis. The plurality of second liner electrodes PEc are located in the second liner area A1d, extend in the direction parallel to the Y-axis, are arranged at the intervals in the direction parallel to the X-axis, intersect the plurality of first liner electrodes PEb, and are formed integrally with the plurality of first liner electrodes PEb.

FIG. 23 is an expanded plan view showing a part of the common electrode CE of the intelligent reflecting surface RE of the modified example. As show in FIG. 23, the portion of the common electrode CE that is located in each of the individual areas IA includes the plurality of third linear electrodes CEb and the plurality of fourth linear electrodes CEc.

The plurality of third linear electrodes CEb are located in the first liner area A1c and extend in the direction parallel to the plurality of first liner electrodes PEb. In plan view, each of the third linear electrodes CEb overlaps with a corresponding first liner electrode PEb.

The plurality of fourth linear electrodes CEc are located in the plurality of second liner areas A1d, extend in the direction parallel to the plurality of second liner electrodes PEc, intersect the plurality of third linear electrodes CEb, and are formed integrally with the plurality of third linear electrodes CEb. In plan view, each of the fourth linear electrodes CEc overlaps with a corresponding second liner electrode PEc.

The portion of the common electrode CE that is located in each of the individual areas IA includes the third linear electrodes CEb and the fourth linear electrodes CEc. The third linear electrode CEb is located in the first liner area A1c and extends in the direction parallel to the plurality of first liner electrodes PEb. The fourth linear electrode CEc is located in the plurality of second liner areas A1d, extends in the direction parallel to the second liner electrode PEc, intersects the third linear electrode CEb, and is formed integrally with the third linear electrode CEb. The portion of the common electrode CE that is located in each of the individual areas IA has a shape of rotational symmetry at 90 degrees in plan view.

In the modified example, the plurality of third linear electrodes CEb arranged in the direction parallel to the X-axis are connected to and formed integrally with each other in the connection area CA. The plurality of fourth linear electrodes CEc arranged in the direction parallel to the Y-axis are connected to and formed integrally with each other in the connection area CA.

The same advantages as those of the above-described second embodiment can also be obtained from the modified example configured as described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the patch electrodes PE and the common electrode CE of each of the examples and the modified example of the first embodiment may be applied in the intelligent reflecting surface RE of the second embodiment. The patch electrodes PE and the common electrode CE of the modified example of the second embodiment may be applied in the intelligent reflecting surface RE of the first embodiment.

In the first embodiment, lines for connecting the plurality of patch electrodes PE with each other are not limited to the connection lines L located on the same layer as the patch electrodes PE. A line for connecting the adjacent patch electrodes PE may be a bridge line of a layer different from that of the patch electrodes PE. The bridge line is connected to one patch electrode PE through a contact hole and is connected to another patch electrode PE through another contact hole.

Any liquid crystal modes that can apply vertical electric field to the liquid crystal layer LC can be used for the intelligent reflecting surface RE. Therefore, a twisted nematic (TN) mode, an electrically controlled birefringence (ECB) mode, or a n cell can be used for the intelligent reflecting surface RE.

The contents of the present inventions will be described below.

(1) An intelligent reflecting surface, comprising:

a plurality of individual areas arranged in a matrix along each of an X-axis and a Y-axis orthogonal to each other, each of the plurality of individual areas including a first area and one or more second areas other than the first area;

a connection area located in gaps between the plurality of individual areas, the connection area having a grating shape and being connected to the plurality of individual areas;

a first substrate including a plurality of patch electrodes, each of the plurality of patch electrodes being located in the first area of a corresponding individual area among the plurality of individual areas;

a second substrate including a common electrode, the common electrode being located in the first area of each of the plurality of individual areas and the connection area and being opposed to the plurality of patch electrodes in a direction parallel to a Z-axis orthogonal to each of the X-axis and the Z-axis; and a liquid crystal layer held between the first substrate and the second substrate and opposed to the plurality of patch electrodes.

(2) The intelligent reflecting surface according to (1), wherein each of the plurality of patch electrodes and the common electrode is formed of a metal.

(3) The intelligent reflecting surface according to (2), wherein the first area is a cross-shaped area and includes a first linear area extending in a direction parallel to the X-axis and a second linear area extending in a direction parallel to the Y-axis and intersecting the first linear area, each of the plurality of patch electrodes has a cross shape and is located in the first area, and a portion of the common electrode, which is located in each of the plurality of individual areas, has the cross shape and is located in the first area.

(4) The intelligent reflecting surface according to (2), wherein the first area is a cross-shaped area and includes a first linear area extending in a direction parallel to the X-axis and a second linear area extending in a direction parallel to the Y-axis and intersecting the first linear area, each of the plurality of patch electrodes includes:

a plurality of first linear electrodes located in the first linear area, extending in the direction parallel to the X-axis, and arranged at intervals in the direction parallel to the Y-axis; and a plurality of second linear electrodes located in the second linear area, extending in the direction parallel to the Y-axis, arranged at intervals in the direction parallel to the X-axis, intersecting the plurality of first linear electrodes, and formed integrally with the plurality of first linear electrodes, and a portion of the common electrode, which is located in each of the plurality of individual areas, includes:

a plurality of third linear electrodes located in the first linear area and extending parallel to the plurality of first linear electrodes; and a plurality of fourth linear electrodes located in the second linear area, extending parallel to the plurality of second linear electrodes, intersecting the plurality of third linear electrodes, and formed integrally with the plurality of third linear electrodes.

(5) The intelligent reflecting surface according to (2), wherein the first area is a frame-shaped area, the second area is an area surrounded by the first area, each of the plurality of patch electrodes has the frame shape and is located in the first area, and a portion of the common electrode, which is located in each of the plurality of individual areas, has the frame shape and is located in the first area.

(6) The intelligent reflecting surface according to (2), wherein the first area is a square grating-shaped area and includes a frame-shaped area and a grating-shaped area surrounded by the frame-shaped area and connected to the frame-shaped area, the grating-shaped area includes:

a plurality of first linear areas extending in the direction parallel to the X-axis and arranged at intervals in the direction parallel to the Y-axis; and a plurality of second linear areas extending in the direction parallel to the Y-axis, arranged at intervals in the direction parallel to the X-axis, and intersecting the plurality of first linear areas, each of the plurality of patch electrodes includes:

a first frame-shaped electrode located in the frame-shaped area and having a frame shape;

a plurality of first linear electrodes located in the plurality of first linear areas in a one-to-one correspondence and extending in the direction parallel to the X-axis; and a plurality of second linear electrodes located in the plurality of second linear areas in a one-to-one correspondence and extending in the direction parallel to the Y-axis, intersecting the plurality of first linear electrodes, and formed integrally with the first frame-shaped electrode and the plurality of first linear electrodes, and a portion of the common electrode, which is located in each of the plurality of individual areas, includes:

a second frame-shaped electrode located in the frame-shaped area and extending parallel to the first frame-shaped electrode;

a plurality of third linear electrodes located in the plurality of first linear areas in a one-to-one correspondence and extending parallel to the plurality of first linear electrodes; and a plurality of fourth linear electrodes located in the plurality of second linear areas in a one-to-one correspondence, extending parallel to the plurality of second linear electrodes, intersecting the plurality of third linear electrodes, and formed integrally with the second frame-shaped electrode and the plurality of third linear electrodes.

(7) The intelligent reflecting surface according to (1), wherein a shape of a portion of the common electrode, which is located in each of the plurality of individual areas, is the same as a shape of each of the plurality of patch electrodes, and the portion of the common electrode, which is located in each of the plurality of individual areas, overlaps with a corresponding patch electrode among the plurality of patch electrodes in plan view.

(8) The intelligent reflecting surface according to (7), wherein the first area is a cross-shaped area and includes a first linear area extending in a direction parallel to the X-axis and a second linear area extending in a direction parallel to the Y-axis and intersecting the first linear area, each of the plurality of patch electrodes has a cross shape and is located in the first area, and a portion of the common electrode, which is located in each of the plurality of individual areas, has the cross shape and is located in the first area.

(9) The intelligent reflecting surface according to (7), wherein the first area is a cross-shaped area and includes a first linear area extending in a direction parallel to the X-axis and a second linear area extending in a direction parallel to the Y-axis and intersecting the first linear area, each of the plurality of patch electrodes includes:

a plurality of first linear electrodes located in the first linear area, extending in the direction parallel to the X-axis, and arranged at intervals in the direction parallel to the Y-axis; and a plurality of second linear electrodes located in the second linear area, extending in the direction parallel to the Y-axis, arranged at intervals in the direction parallel to the X-axis, intersecting the plurality of first linear electrodes, and formed integrally with the plurality of first linear electrodes, and a portion of the common electrode, which is located in each of the plurality of individual areas, includes:

a plurality of third linear electrodes located in the first linear area and extending parallel to the plurality of first linear electrodes; and a plurality of fourth linear electrodes located in the second linear area, extending parallel to the plurality of second linear electrodes, intersecting the plurality of third linear electrodes, and formed integrally with the plurality of third linear electrodes.

(10) The intelligent reflecting surface according to (7), wherein the first area is a frame-shaped area, the second area is an area surrounded by the first area, each of the plurality of patch electrodes has the frame shape and is located in the first area, and a portion of the common electrode, which is located in each of the plurality of individual areas, has the frame shape and is located in the first area.

(11) The intelligent reflecting surface according to (7), wherein the first area is a square grating-shaped area and includes a frame-shaped area and a grating-shaped area surrounded by the frame-shaped area and connected to the frame-shaped area, the grating-shaped area includes:

a plurality of first linear areas extending in the direction parallel to the X-axis and arranged at intervals in the direction parallel to the Y-axis; and a plurality of second linear areas extending in the direction parallel to the Y-axis, arranged at intervals in the direction parallel to the X-axis, and intersecting the plurality of first linear areas, each of the plurality of patch electrodes includes:

a first frame-shaped electrode located in the frame-shaped area and having a frame shape;

a plurality of first linear electrodes located in the plurality of first linear areas in a one-to-one correspondence and extending in the direction parallel to the X-axis; and a plurality of second linear electrodes located in the plurality of second linear areas in a one-to-one correspondence and extending in the direction parallel to the Y-axis, intersecting the plurality of first linear electrodes, and formed integrally with the first frame-shaped electrode and the plurality of first linear electrodes, and a portion of the common electrode, which is located in each of the plurality of individual areas, includes:

a second frame-shaped electrode located in the frame-shaped area and extending parallel to the first frame-shaped electrode;

a plurality of third linear electrodes located in the plurality of first linear areas in a one-to-one correspondence and extending parallel to the plurality of first linear electrodes; and a plurality of fourth linear electrodes located in the plurality of second linear areas in a one-to-one correspondence, extending parallel to the plurality of second linear electrodes, intersecting the plurality of third linear electrodes, and formed integrally with the second frame-shaped electrode and the plurality of third linear electrodes.

(12) The intelligent reflecting surface according to (1), wherein the first area is a cross-shaped area and includes a first linear area extending in a direction parallel to the X-axis and a second linear area extending in a direction parallel to the Y-axis and intersecting the first linear area, each of the plurality of patch electrodes has the cross shape and is located in the first area, and a portion of the common electrode, which is located in each of the plurality of individual areas, has the cross shape and is located in the first area.

(13) The intelligent reflecting surface according to (1), wherein the first area is a cross-shaped area and includes a first linear area extending in a direction parallel to the X-axis and a second linear area extending in a direction parallel to the Y-axis and intersecting the first linear area, each of the plurality of patch electrodes includes:

a plurality of first linear electrodes located in the first linear area, extending in the direction parallel to the X-axis, and arranged at intervals in the direction parallel to the Y-axis; and a plurality of second linear electrodes located in the second linear area, extending in the direction parallel to the Y-axis, arranged at intervals in the direction parallel to the X-axis, intersecting the plurality of first linear electrodes, and formed integrally with the plurality of first linear electrodes, and a portion of the common electrode, which is located in each of the plurality of individual areas, includes:

a plurality of third linear electrodes located in the first linear area and extending parallel to the plurality of first linear electrodes; and a plurality of fourth linear electrodes located in the second linear area, extending parallel to the plurality of second linear electrodes, intersecting the plurality of third linear electrodes, and formed integrally with the plurality of third linear electrodes.

(14) The intelligent reflecting surface according to (1), wherein the first area is a frame-shaped area, the second area is an area surrounded by the first area, each of the plurality of patch electrodes has the frame shape and is located in the first area, and a portion of the common electrode, which is located in each of the plurality of individual areas, has the frame shape and is located in the first area.

(15) The intelligent reflecting surface according to (1), wherein the first area is a square grating-shaped area and includes a frame-shaped area and a grating-shaped area surrounded by the frame-shaped area and connected to the frame-shaped area, the grating-shaped area includes:

a plurality of first linear areas extending in the direction parallel to the X-axis and arranged at intervals in the direction parallel to the Y-axis; and a plurality of second linear areas extending in the direction parallel to the Y-axis, arranged at intervals in the direction parallel to the X-axis, and intersecting the plurality of first linear areas, each of the plurality of patch electrodes includes:

a first frame-shaped electrode located in the frame-shaped area and having a frame shape;

a plurality of first linear electrodes located in the plurality of first linear areas in a one-to-one correspondence and extending in the direction parallel to the X-axis; and a plurality of second linear electrodes located in the plurality of second linear areas in a one-to-one correspondence and extending in the direction parallel to the Y-axis, intersecting the plurality of first linear electrodes, and formed integrally with the first frame-shaped electrode and the plurality of first linear electrodes, and a portion of the common electrode, which is located in each of the plurality of individual areas, includes:

a second frame-shaped electrode located in the frame-shaped area and extending parallel to the first frame-shaped electrode;

a plurality of third linear electrodes located in the plurality of first linear areas in a one-to-one correspondence and extending parallel to the plurality of first linear electrodes; and a plurality of fourth linear electrodes located in the plurality of second linear areas in a one-to-one correspondence, extending parallel to the plurality of second linear electrodes, intersecting the plurality of third linear electrodes, and formed integrally with the second frame-shaped electrode and the plurality of third linear electrodes.

(16) The intelligent reflecting surface according to (1), wherein a shape of each of the plurality of patch electrodes and a portion of the common electrode located in each of the plurality of individual areas is rotational symmetry at 90 degrees in plan view.

(17) The intelligent reflecting surface according to (16), wherein the shape has square contour.

What is claimed is:

1. An intelligent reflecting surface, comprising:

a plurality of individual areas arranged in a matrix along each of an X-axis and a Y-axis orthogonal to each other, each of the plurality of individual areas including a first area and one or more second areas other than the first area;

a connection area located in gaps between the plurality of individual areas, the connection area having a grating shape and being connected to the plurality of individual areas;

a first substrate including a plurality of patch electrodes, each of the plurality of patch electrodes being located in the first area of a corresponding individual area among the plurality of individual areas;

a second substrate including a common electrode, the common electrode being located in the first area of each of the plurality of individual areas and the connection area and being opposed to the plurality of patch electrodes in a direction parallel to a Z-axis orthogonal to each of the X-axis and the Z-axis;

a liquid crystal layer held between the first substrate and the second substrate and opposed to the plurality of patch electrodes, the first area is a cross-shaped area and includes a first linear area extending in a direction parallel to the X-axis and a second linear area extending in a direction parallel to the Y-axis and intersecting the first linear area, each of the plurality of patch electrodes has a cross shape and is located in the first area, and a portion of the common electrode, which is located in each of the plurality of individual areas, has the cross shape and is located in the first area.

2. The intelligent reflecting surface according to claim 1, wherein each of the plurality of patch electrodes and the common electrode is formed of a metal.

3. The intelligent reflecting surface according to claim 1, wherein a shape of a portion of the common electrode, which is located in each of the plurality of individual areas, is the same as a shape of each of the plurality of patch electrodes, and the portion of the common electrode, which is located in each of the plurality of individual areas, overlaps with a corresponding patch electrode among the plurality of patch electrodes in plan view.

4. The intelligent reflecting surface according to claim 1, wherein each of the plurality of patch electrodes includes:

a plurality of first linear electrodes located in the first linear area, extending in the direction parallel to the X-axis, and arranged at intervals in the direction parallel to the Y-axis; and a plurality of second linear electrodes located in the second linear area, extending in the direction parallel to the Y-axis, arranged at intervals in the direction parallel to the X-axis, intersecting the plurality of first linear electrodes, and formed integrally with the plurality of first linear electrodes, and a portion of the common electrode, which is located in each of the plurality of individual areas, includes:

a plurality of third linear electrodes located in the first linear area and extending parallel to the plurality of first linear electrodes; and a plurality of fourth linear electrodes located in the second linear area, extending parallel to the plurality of second linear electrodes, intersecting the plurality of third linear electrodes, and formed integrally with the plurality of third linear electrodes.

5. The intelligent reflecting surface according to claim 1, wherein a shape of each of the plurality of patch electrodes and a portion of the common electrode located in each of the plurality of individual areas is rotational symmetry at 90 degrees in plan view.

6. The intelligent reflecting surface according to claim 5, wherein the shape is square.

7. An intelligent reflecting surface comprising:

a plurality of individual areas arranged in a matrix along each of an X-axis and a Y-axis orthogonal to each other, each of the plurality of individual areas including a first area and one or more second areas other than the first area;

a connection area located in gaps between the plurality of individual areas, the connection area having a grating shape and being connected to the plurality of individual areas;

a first substrate including a plurality of patch electrodes, each of the plurality of patch electrodes being located in the first area of a corresponding individual area among the plurality of individual areas;

a second substrate including a common electrode, the common electrode being located in the first area of each of the plurality of individual areas and the connection area and being opposed to the plurality of patch electrodes in a direction parallel to a Z-axis orthogonal to each of the X-axis and the Z-axis; and a liquid crystal layer held between the first substrate and the second substrate and opposed to the plurality of patch electrodes, wherein the first area is a square grating-shaped area and includes a frame-shaped area and a grating-shaped area surrounded by the frame-shaped area and connected to the frame-shaped area, the grating-shaped area includes:

a plurality of first linear areas extending in the direction parallel to the X-axis and arranged at intervals in the direction parallel to the Y-axis; and a plurality of second linear areas extending in the direction parallel to the Y-axis, arranged at intervals in the direction parallel to the X-axis, and intersecting the plurality of first linear areas, each of the plurality of patch electrodes includes:

a first frame-shaped electrode located in the frame-shaped area and having a frame shape;

a plurality of first linear electrodes located in the plurality of first linear areas in a one-to-one correspondence and extending in the direction parallel to the X-axis; and a plurality of second linear electrodes located in the plurality of second linear areas in a one-to-one correspondence and extending in the direction parallel to the Y-axis, intersecting the plurality of first linear electrodes, and formed integrally with the first frame-shaped electrode and the plurality of first linear electrodes, and a portion of the common electrode, which is located in each of the plurality of individual areas, includes:

a second frame-shaped electrode located in the frame-shaped area and extending parallel to the first frame-shaped electrode;

a plurality of third linear electrodes located in the plurality of first linear areas in a one-to-one correspondence and extending parallel to the plurality of first linear electrodes; and a plurality of fourth linear electrodes located in the plurality of second linear areas in a one-to-one correspondence, extending parallel to the plurality of second linear electrodes, intersecting the plurality of third linear electrodes, and formed integrally with the second frame-shaped electrode and the plurality of third linear electrodes.

\* \* \* \* \*